United States Patent [19]
Sakakibara

[11] Patent Number: 6,037,966
[45] Date of Patent: Mar. 14, 2000

[54] PRINTING CONTROL WITH CORRECTION FOR NON-LINEARITIES

[75] Inventor: Manabu Sakakibara, Numazu, Japan

[73] Assignee: Canon Kabushiki Kaisha, Tokyo, Japan

[21] Appl. No.: 08/651,719

[22] Filed: May 22, 1996

[30] Foreign Application Priority Data

May 23, 1995 [JP] Japan ................................... 7-123458
Jun. 14, 1995 [JP] Japan ................................... 7-147275

[51] Int. Cl.$^7$ ............................................. H04N 1/40
[52] U.S. Cl. .................... 347/252; 347/251; 347/240; 347/131; 358/298
[58] Field of Search ........................ 347/252, 251, 347/240, 131, 246, 247; 358/298; 395/106–109

[56] References Cited

U.S. PATENT DOCUMENTS 5,457,489 10/1995 Yamamoto et al. .................... 347/251
5,541,740 7/1996 Mikihiro Mori ........................ 358/447
5,696,603 12/1997 Toyomura et al. ..................... 358/458

*Primary Examiner*—N. Le
*Assistant Examiner*—Hai C. Pham
*Attorney, Agent, or Firm*—Fitzpatrick, Cella, Harper & Scinto

[57] ABSTRACT

An image processor includes an input device for inputting image signals, and a correcting device for correcting the image signals. A generating device generates a pulse-width modulation signal responsive to an image signal corrected by the correcting device, and a light emitting device emits light on the basis of the pulse-width modulation signal. A detecting device detects the pulse width of light emitted from the light emitting device, and a setting device sets correction conditions of the correcting device on the basis of the pulse width detected by the detecting device when a predetermined signal is supplied to the generating device.

26 Claims, 26 Drawing Sheets

FIG. 10

| INPUT AD (7..0) | OUTPUT DT (7..0) |
| --- | --- |
| 00h | 00h |
| 01h | 03h |
| 02h | 06h |
| 03h | 09h |
| 04h | 0Bh |
| 05h | 0Dh |
| 7Ch | 83h |
| 7Dh | 84h |
| 7Eh | 85h |
| 7Fh | 86h |
| 80h | 87h |
| 81h | 88h |
| FAh | F3h |
| FBh | F4h |
| FCh | F6h |
| FDh | F9h |
| FEh | FCh |
| FFh | FFh |

(INITIAL VALUE)

FIG. 14

| | PARTS VARIATIONS | | |
|---|---|---|---|
| | -100ppm (min) | 0ppm (typ) | +100ppm (max) |
| PCLK 20.00MHz | 49.9950nsec | 50.0000nsec | 50.0050nsec |
| SCLK 19.99MHz | 50.0200nsec | 50.0250nsec | 50.0300nsec |

FIG. 15

| FREQUENCY DIFFERENCE BETWEEN PCLK AND SCLK, i.e., VARIATIONS IN EQUIVALENT SAMPLING RATE | | | |
|---|---|---|---|
| | (min) | (typ) | (max) |
| PCLK - SCLK | 0.0150nsec | 0.0250nsec | 0.0350nsec |
| NUMBER OF SAMPLINGS OF PCLK | 1429 | 2000 | 3333 |
| VARIATION | -28.6% | 0% | +66.7% |

EDGE DATA

| DT | 15 | 14 13 12 11 10 9 8 7 6 5 4 3 2 1 0 |
|---|---|---|
| | R/D | COUNT VALUE |

1...FALLING EDGE
0...RISING EDGE

FIG. 20

| DT | 15 | 14 13 12 11 10 9 8 7 6 5 4 3 2 1 0 |
|---|---|---|
| | 0 | 13 |
| | 1 | 35 |
| | 0 | 2013 |
| | 1 | 2035 |
| | | |

FIG. 21

| DT | 15 | 14 13 12 11 10 9 8 7 6 5 4 3 2 1 0 |
|---|---|---|
| | 0 | 26 |
| | 1 | 1026 |
| | 0 | 2026 |
| | 1 | 3026 |
| | | |

FIG. 22

| DT | 0 | 1 | 2 | 3 | 4 | 5 | 6 | 7 | 8 | 9 | 10 | 11 | 12 | 13 | 14 | 15 |
|----|---|---|---|---|---|---|---|---|---|---|----|----|----|----|----|----|
|    |   |   |   |   |   |   |   |   | 13 |   |    |    |    |    |    | 0  |
|    |   |   |   |   |   |   |   |   | xx |   |    |    |    |    |    | 1  |
|    |   |   |   |   |   |   |   |   | xx |   |    |    |    |    |    | 0  |
|    |   |   |   |   |   |   |   |   | 35 |   |    |    |    |    |    | 1  |
|    |   |   |   |   |   |   |   |   | xx |   |    |    |    |    |    | 0  |
|    |   |   |   |   |   |   |   | 2013 |   |    |    |    |    |    | 1  |
|    |   |   |   |   |   |   |   |   | xx |   |    |    |    |    |    | 0  |
|    |   |   |   |   |   |   |   |   | xx |   |    |    |    |    |    | 1  |
|    |   |   |   |   |   |   |   | 2035 |   |    |    |    |    |    | 0  |
|    |   |   |   |   |   |   |   |   |    |   |    |    |    |    |    | 1  |

FIG. 23

| DT | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| | 0 | | | | | | 26 | | | | | | | | | |
| | 1 | | | | | | xx | | | | | | | | | |
| | 0 | | | | | | xx | | | | | | | | | |
| | 1 | | | | | | 1026 | | | | | | | | | |
| | 0 | | | | | | xx | | | | | | | | | |
| | 1 | | | | | | xx | | | | | | | | | |
| | 0 | | | | | | 2026 | | | | | | | | | |
| | 1 | | | | | | xx | | | | | | | | | |
| | 0 | | | | | | xx | | | | | | | | | |
| | 1 | | | | | | 3026 | | | | | | | | | |

FIG. 25

| INPUT AD (7..0) | OUTPUT DT (7..0) |
| --- | --- |
| 00h | 04h |
| 01h | 07h |
| 02h | 0Ah |
| 03h | 0Dh |
| 04h | 0Fh |
| 05h | 11h |
| 7Ch | 7Eh |
| 7Dh | 7Fh |
| 7Eh | 80h |
| 7Fh | 81h |
| 80h | 82h |
| 81h | 83h |
| FAh | E5h |
| FBh | E6h |
| FCh | E8h |
| FDh | EBh |
| FEh | EEh |
| FFh | F1h |

(AFTER CALIBRATION)

PRINTING CONTROL WITH CORRECTION FOR NON-LINEARITIES

BACKGROUND OF THE INVENTION

1. Field of the Invention

The present invention relates to an image processing apparatus and a method therefor and, more particularly, to an image processing apparatus for outputting gradation images and a method therefor.

2. Description of the Related Art

An image processing apparatus employing an electrophotographic process, for example, a laser beam printer employing laser scanning technology, has attracted attention from the points of view of high image quality, high-speed print, low noise, and so on. In such an apparatus, to obtain still higher image quality, a method is known of managing resolution and intermediate gradation at the same time by one-dot multi-valued recording.

As one-dot multi-valued recording, there is a method of obtaining smooth continuous gradations by controlling (pulse-width modulating) the laser emission time per one dot with the laser emission intensity (laser current value) maintained at a constant value. Since this method is close to binary recording, it is possible to perform relatively stable recording.

In another example, a full-color printer has been put into practical use, which forms gradation images for each toner of yellow, magenta, cyan, and black, and superimposes the images on one another.

FIG. 1 shows the construction of a pulse-width modulation circuit which performs 8-bit pulse-width modulation at an image clock PCLK of 20 MHz (50 ns).

Referring to FIG. 1, reference numeral 501 denotes a D/A converter. Reference numeral 502 denotes a variable resistor which attenuates the output of the D/A converter 501. Reference numeral 503 denotes a variable resistor which generates an offset voltage OFS. Reference numeral 504 denotes an adder. Reference numeral 505 denotes a triangular-wave generating circuit which generates a triangular wave in synchronization with the image clock PCLK. Reference numeral 506 denotes a comparator.

FIG. 2 shows signal waveforms of each section of the pulse-width modulation circuit, showing a state in which the comparator 506 performs a voltage comparison between a triangular wave /TRI which is generated in synchronization with the image clock PCLK and an output DA of the adder 504 which is proportional to image data VDO (0 . . . 7), and negative pulse-width modulation output /PVDO is obtained.

Toner is adhered by a print mechanism (not shown) in the interval in which the negative pulse-width modulation output /PVDO is at a low level Lo, and a print result shown in FIG. 2 is obtained.

However, in this electrophotographic process, the relation between the pulse width of signals and the print density is not linear, and becomes non-linear as shown in FIG. 3. This non-linear curve is called a γ curve. Accordingly, by making the pulse width area min to max in which the print density varies in 256 steps (for example, the area in which the pulse width is from 20% to 80% is made in 256 steps, i.e., 0.6/256=0.23% steps) rather than making 0% to 100% of the pulse width in 256 steps (i.e., 1/256=0.39% steps), the steps of the pulse in the area where the curve is sharp is made as small as possible so as to improve the gradation of the print density.

This setting of the minimum/maximum pulse width is performed before the product is shipped from the factory. The procedure is as follows: initially, image data VDO (0 . . . 7) is set at 00h, and the variable resistor 503 shown in FIG. 1 is adjusted (offset voltage OFS is applied) so that the negative pulse-width modulation output /PVDO becomes, for example, 20% (10 ns), thus setting the minimum pulse width. Next, image data VDO (0 . . . 7) is set at FFh, and the variable resistor 502 shown in FIG. 1 is adjusted (the output of the D/A converter 501 is attenuated) so that the negative pulse-width modulation output /PVDO becomes 80% (40 ns), thus setting the maximum pulse width.

The performance of pulse-width modulation for making the interval of the minimum/maximum pulse width which is set in this way to 256 steps makes the pulse width variable amount per one step which is 195 Ps (50 ns/256) smaller to 117 ps ((40–10) ns/256), and thus the gradation of the print density is improved.

However, the above-described technology has the following problems. As described above, the setting of the minimum/maximum pulse width is performed by a variable resistor. However, the accuracy required for that adjustment is extremely high, for example, (80–20)%/256=0.23% or more. However, since the resolution of a low-price variable resistor is low, it is difficult to suppress the adjustment error within a range which satisfies the required accuracy, and variations shown in FIG. 4 occur. Also, even if adjustments can be made, the pulse width varies due to temperature change or aging. Further, there are about several % of variations in the semiconductor laser emission threshold value current, and even if the adjustment accuracy of the pulse-width modulation circuit is improved with the variations being ignored, this adjustment is meaningless with respect to reducing the error.

SUMMARY OF THE INVENTION

In view of the above-described problems of the prior art, it is an object of the present invention to provide an image processing apparatus which is capable of always obtaining stable, high quality gradation images, and a method therefor.

To achieve the above-described object, according to one aspect of the present invention, there is provided an image processing apparatus including, input means for inputting image signals, correcting means for correcting the image signals, generating means for generating a pulse-width modulation signal responsive to an image signal corrected by the correcting means, light emitting means for emitting light on the basis of the pulse-width modulation signal, detecting means for detecting the pulse width of light emitted from the light emitting means, and setting means for setting correction conditions of the correcting means on the basis of the pulse width detected by the detecting means when a predetermined signal is supplied to the generating means.

According to another aspect of the present invention, there is provided an image processing method including, an input step of inputting image signals, a correcting step of correcting the image signals, a generation step of generating a pulse-width modulation signal responsive to to the image signal corrected in the correcting step, a detection step of detecting the pulse width of the pulse-width modulation signal generated in the generation step, and a setting step of setting correction conditions of the correcting step on the basis of the pulse width detected in the detection step when a predetermined signal is supplied to the generation step.

Other objects, features and advantages of the invention will become apparent from the following detailed description taken in conjunction with the accompanying drawings.

BRIEF DESCRIPTION OF THE DRAWINGS

FIG. 10 shows an example of a data conversion table (initial values) of the look-up table (LUT) 44 shown in FIG. 8;

FIG. 14 is a table which shows parts variations of a clock generator;

FIG. 15 is a table which shows variations of a sampling rate;

FIG. 20 shows an example of data stored in the memory shown in FIG. 17;

FIG. 21 shows an example of data stored in the memory shown in FIG. 17;

FIG. 22 shows a state in which unnecessary sampling data is stored in memory in the case of 200-line (200 dpi) PWM process;

FIG. 23 shows a state in which unnecessary sampling data is stored in memory in the case of a 200-line (200 dpi) PWM process;

FIG. 25 shows an example of a data conversion table (after calibration) of the LUT 44 shown in FIG. 8;

DETAILED DESCRIPTION OF THE PREFERRED EMBODIMENTS

Preferred embodiments of an image processing apparatus of the present invention will be described below in detail with reference to the accompanying drawings.

[First Embodiment]

[Construction]

Figure 5:
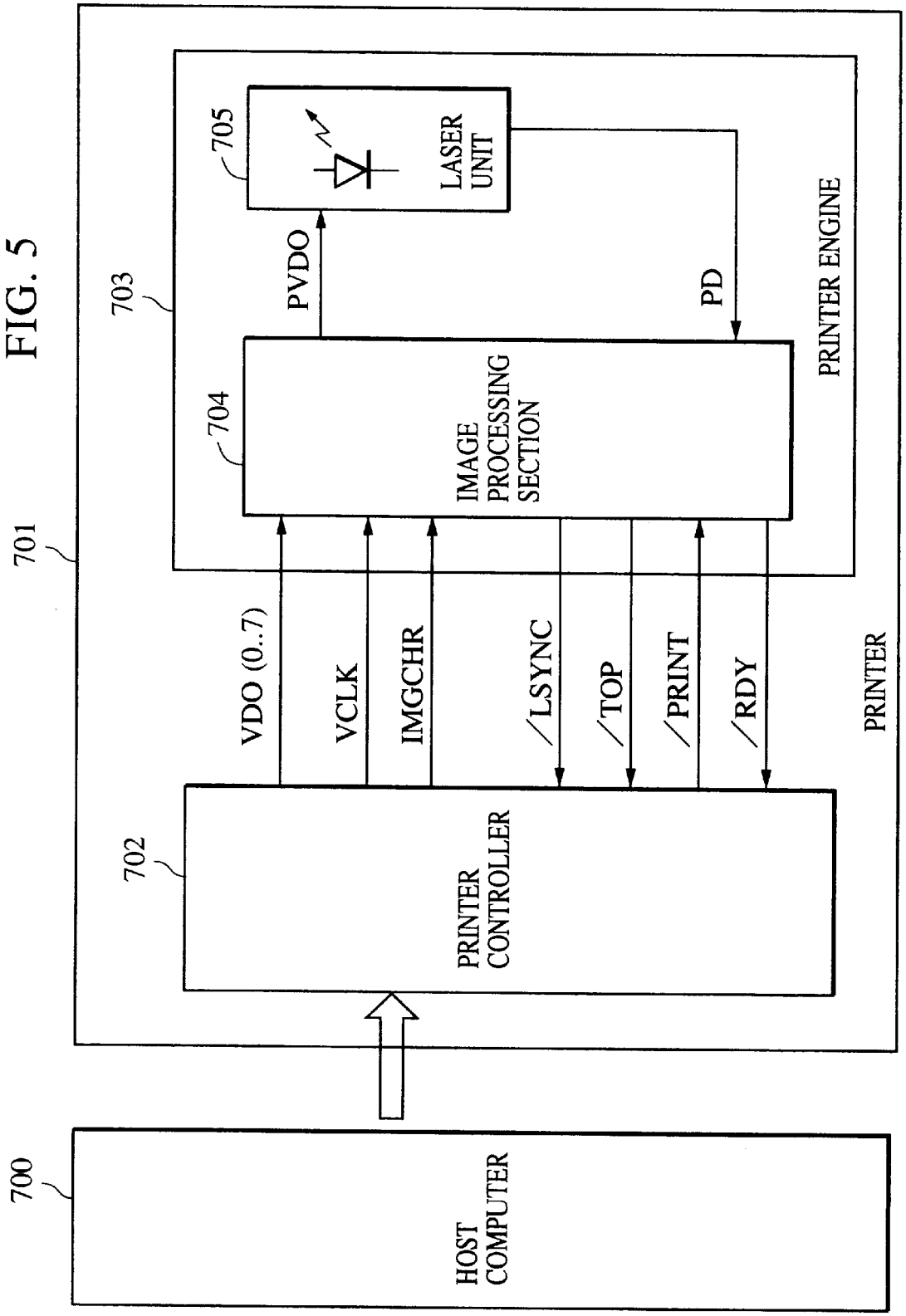
FIG. 5 is a block diagram illustrating the construction of an image processing apparatus in accordance with a first embodiment of the present invention.

FIG. 5 is a block diagram illustrating the construction of an image processing apparatus in accordance with the first embodiment of the present invention;

Referring to FIG. 5, reference numeral 701 denotes a printer, which is a laser beam printer capable of printing a full-color image. The printer 701 comprises a printer controller 702 for developing image codes provided by a host computer 700 which is an external unit into, for example, 8-bit image data VDO (0 . . . 7) corresponding to each toner of yellow, magenta, cyan, and black, and a printer engine 703 for performing printing by pulse-width modulation (PWM) on the basis of the developed image data VDO (0 . . . 7). A description will be given below assuming the resolution of the printer 701 to be 600 dpi. However, the resolution of the printer 701 is not limited to 600 dpi.

Main signals exchanged between the printer controller 702 and an image processing section 704 of the printer engine 703 are the above-described image data VDO (0 . . . 7), an IMGCHR signal (used as a number-of-lines switch signal for switching the number of PWM lines=a signal for switching the resolution, the details of which will be described later) indicating whether the image data represents a natural image, or characters or line arts, image transfer clock VCLK, page synchronization signal /TOP, line synchronization signal /LSYNC, a signal /RDY indicating to the printer controller 702 that the printer engine 703 is ready to print, and a signal /PRINT for instructing the printer engine 703 to start printing. The symbol "/" attached to the symbol name represents negative logic.

Figure 6:
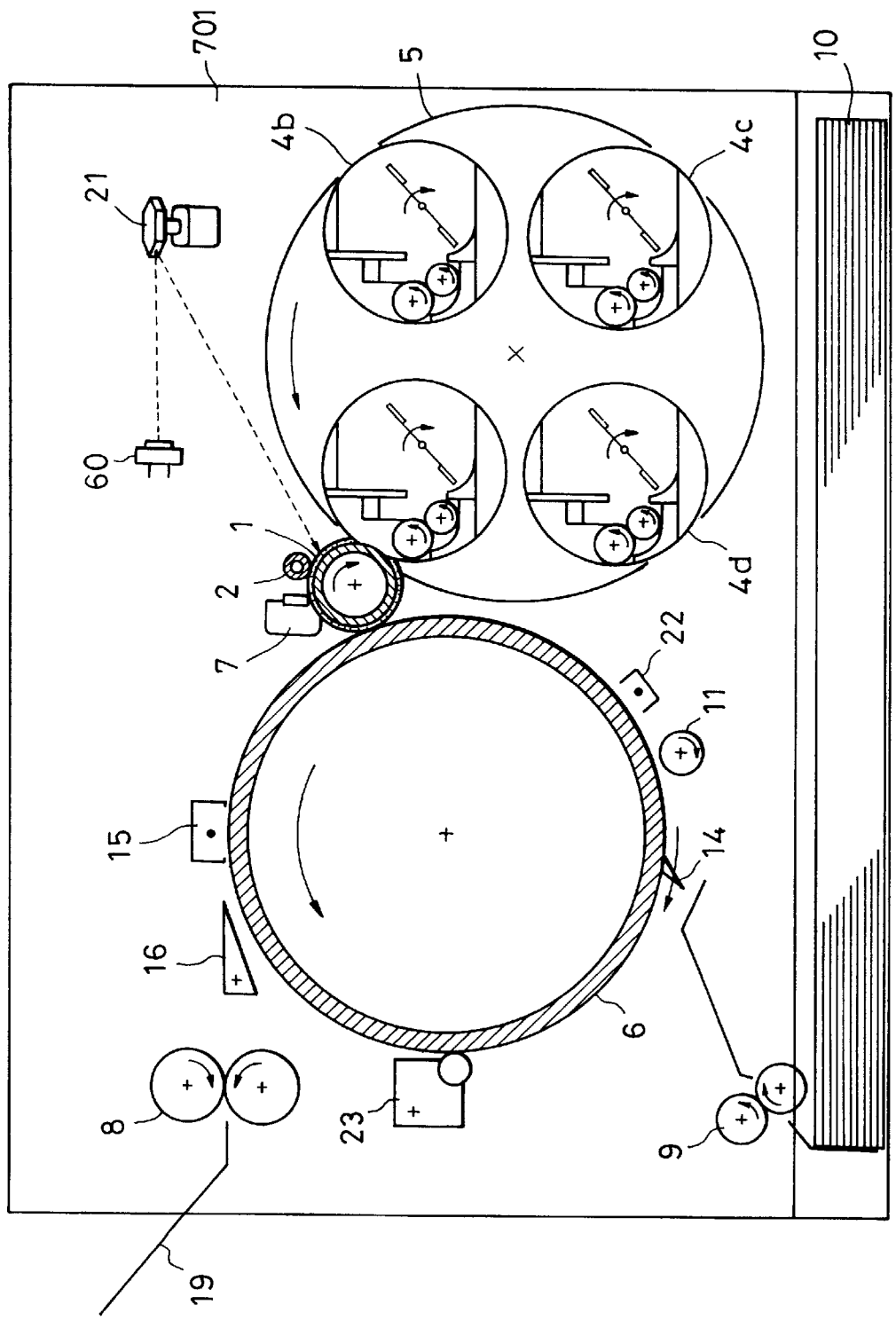
FIG. 6 shows the mechanical construction of a printer shown in FIG. 5.

FIG. 6 shows the mechanical construction of the printer 701.

Referring to FIG. 6, reference numeral 1 denotes a photosensitive drum. Reference numeral 2 denotes a roller charger. Reference numerals 4a to 4d each denote developing units. Reference numeral 5 denotes a support member of the developing units 4a to 4d. Reference numeral 6 denotes a transfer drum. Reference numeral 7 denotes a cleaning unit of the photosensitive drum 1. Reference numeral 8 denotes a fixing unit. Reference numeral 9 denotes a pick-up roller. Reference numeral 10 denotes a paper feed cassette. Reference numeral 11 denotes a suction roller 11. Reference numeral 14 denotes a gripper. Reference numeral 15 denotes a transfer charger. Reference numeral 16 denotes a separation charger. Reference numeral 19 denotes a paper ejection tray. Reference numeral 21 denotes a polygon mirror. Reference numeral 22 denotes a vertical synchronization signal generator. Reference numeral 23 denotes a cleaning unit of the transfer drum 6. Reference numeral 60 denotes a semiconductor laser.

[Operation]

Figure 7:
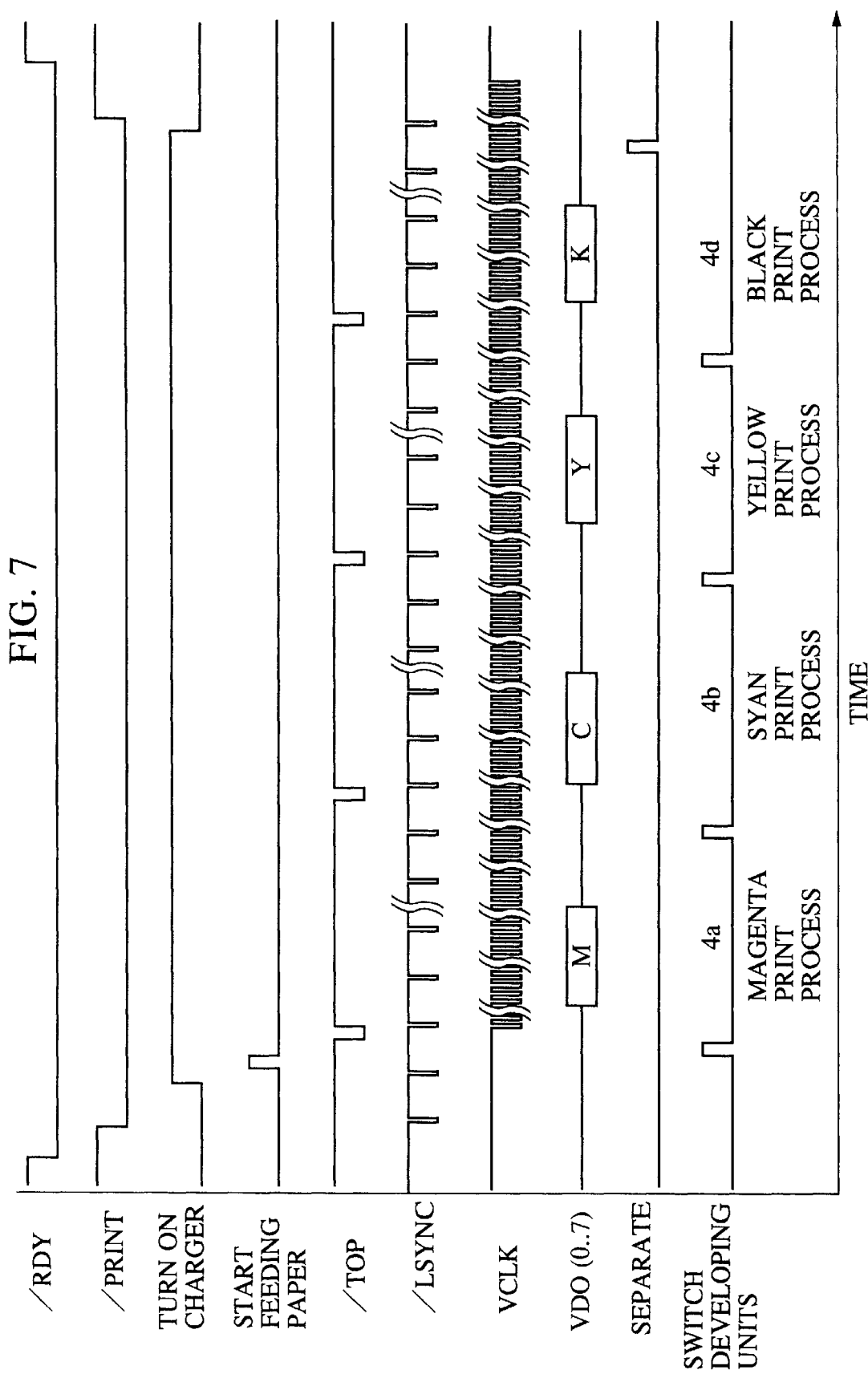
FIG. 7 is a timing diagram illustrating the print operation of the printer shown in FIG. 6.

FIG. 7 is a timing chart illustrating the print operation of the printer 701.

As shown in FIG. 7, the printer controller 702, when the /RDY signal is "true", i.e., the printer engine 703 is ready to print, causes the /PRINT signal to be "true", instructing the printer engine 703 to start the print operation.

Upon receiving the /PRINT signal, the printer engine 703 drivingly rotates the photosensitive drum 1 and the transfer drum 6 in the direction indicated by the arrow in FIG. 6 by means of drive means (not shown). The photosensitive drum 1 is coated with a photoconductive member made of an organic photosensitive member (OPC), A-Si, CdS, or Se on the outer peripheral surface of an aluminum cylinder. Next, the roller charger 2 is turned on to uniformly charge the photosensitive drum 1 at a predetermined electrical potential.

Next, the printer engine 703 feeds recording paper from the paper feed cassette 10 by means of the pick-up roller 9 and supplies the recording paper to the transfer drum 6. The transfer drum 6, having a dielectric sheet spread on a hollow support member, rotates in the direction indicated by the arrow in the figure at the same speed as that of the photosensitive drum 1. The recording paper supplied to the transfer drum 6 is held by the gripper 14 disposed in a part of the support member and sucked into position by the suction roller 11. At the same time, the support member 5 is rotated to make a developing unit 4a having magenta toner, which is a first formation color, face the photosensitive drum 1. A developing unit 4b has cyan toner. A developing unit 4c has yellow toner. A developing unit 4d has black toner.

The vertical synchronization signal generator 22, when the top edge of the recording paper sucked to the transfer drum 6 is detected, generates a vertical synchronization signal /TOP. With this signal /TOP as a trigger, the image processing section 704 sends out a horizontal synchronization signal /LSYNC to the printer controller 702. The printer controller 702, upon receiving the first /TOP signal after causing the /PRINT signal to be "true", sends out image data VDO (0 . . . 7) of magenta in synchronization with the image transfer clock VCLK. The image processing section 704 sends out the pulse-width modulation output PVDO which is modulated according to the received image data to the laser unit 705. Thus, the semiconductor laser 60 within the laser unit 705 emits light according to this signal PVDO. The laser light output from the semiconductor laser 60 scans the photosensitive drum 1 by means of the polygon mirror 21, and a latent image is formed on the photosensitive drum 1. The formed latent image is developed by the selected developing unit 4a, and the developed toner image of magenta is transferred to the recording paper on the transfer drum 6 by means of the transfer roller 11.

Then, the printer engine 703 rotates the support member 5 to cause the developing unit 4b comprising cyan toner, which is a second formation color, to face the photosensitive drum 1. Thereafter, by the same procedure as in the above-described case of the toner image of magenta, the toner image of cyan is transferred to the recording paper. Further, by the same procedure, a toner image of yellow, which is a third formation color, and a toner image of black, which is a fourth formation color, are transferred to the recording paper.

In this way, the recording paper on which toner images of a plurality of colors are formed is separated from the transfer drum 6 by the separation charger 16, and the toner image is melted and fixed by pressurization and heat by the fixing unit 8, after which the recording paper is ejected onto the paper ejection tray 19.

With the above process, a color image is output from the printer 701. The residual toner on the photosensitive drum 1 is cleaned by the cleaning unit 7 comprising blade means. It is preferable that the toner which is adhered onto the transfer drum 6 be cleaned as required by the cleaning unit 23 comprising a fur brush, and a web.

[Image Processing Section]

Figure 8:
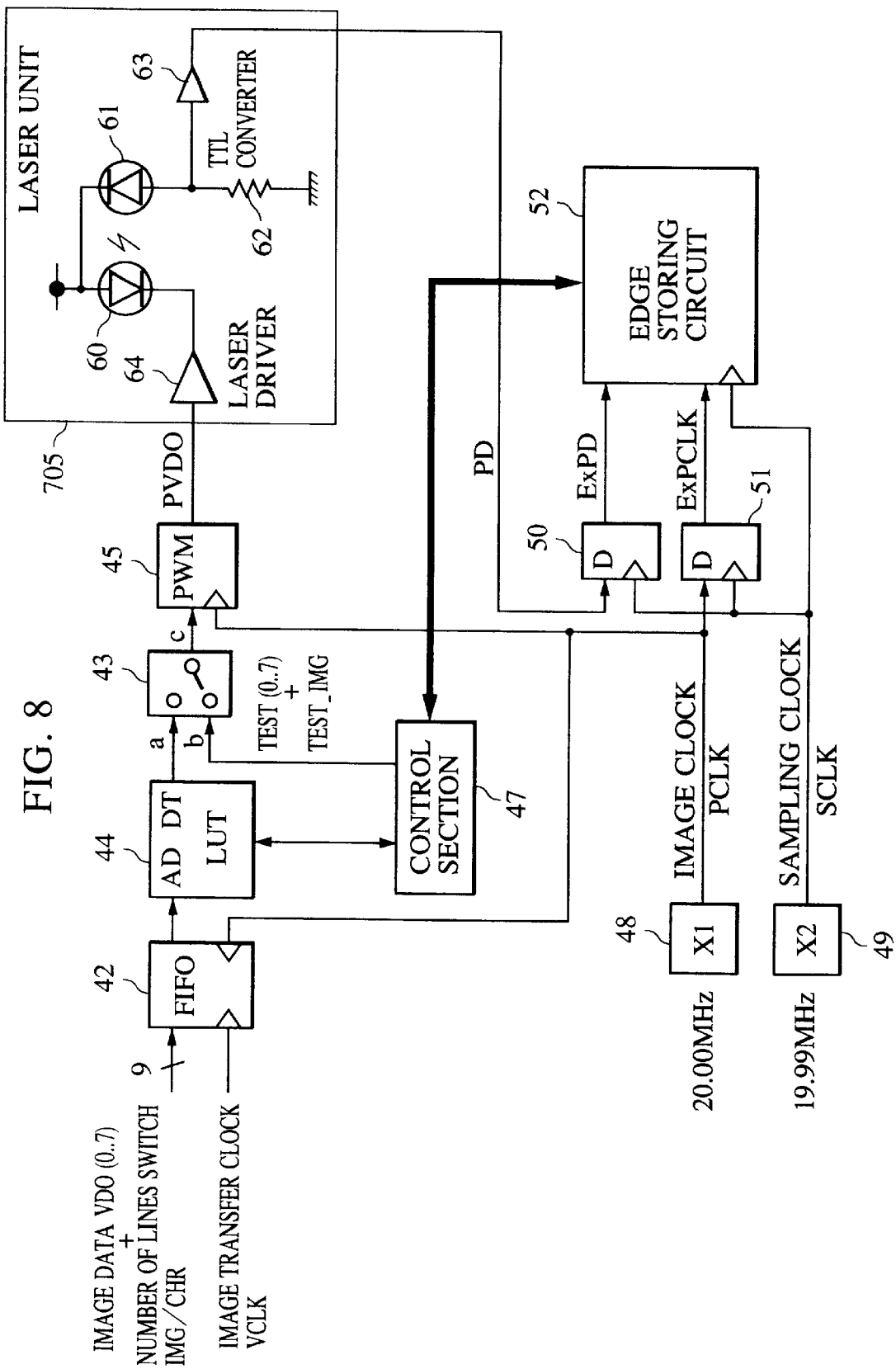
FIG. 8 is a block diagram illustrating the detailed construction of the image processing section and the laser unit shown in FIG. 5.

Next, a description will be given of the image processing section 704 within the printer engine 701. FIG. 8 is a block diagram illustrating the detailed construction of the image processing section 704 and the laser unit 705.

In the image processing section 704, reference numeral 42 denotes a line memory based on FIFO (First-In First-Out). Reference numeral 43 denotes a switch device 43. Reference numeral 44 denotes a look-up table (LUT) made of a SRAM (Static RAM). Reference numeral 45 denotes a PWM circuit. Reference numeral 47 denotes a control section which comprises a program ROM and a work RAM. Reference numeral 48 denotes a clock generator X1 for generating an image clock PCLK of 20 MHz. Reference numeral 49 denotes a clock generator X2 for generating a sampling clock SCLK of 19.99 MHz. Reference numerals 50 and 51 each denote D flip-flops (D-F/F). Reference numeral 52 denotes an edge storing circuit for storing edge information of output waveforms of the D-F/F circuits 50 and 51.

In the laser unit 705, reference numeral 60 denotes a semiconductor laser. Reference numeral 61 denotes a PIN (positive-intrinsic-negative) photodiode, for example, a current-voltage converter, such as a register. Reference numeral 63 denotes a TTL (Transistor Transistor Logic) converter for converting a signal level to a TTL level. Reference numeral 64 denotes a laser driver.

Image processing during the normal printing will be described first.

Image data VDO (0 . . . 7) and an IMGCHR signal which are sent out from the printer controller 702 are written in the line memory 42 in synchronization with the image transfer clock VCLK, and read out in synchronization with the rise of the image clock PCLK. Here, PCLK is an image clock in the print operation of the printer engine 703, and one clock width thereof corresponds to one pixel width of 600 dpi.

Figure 1:
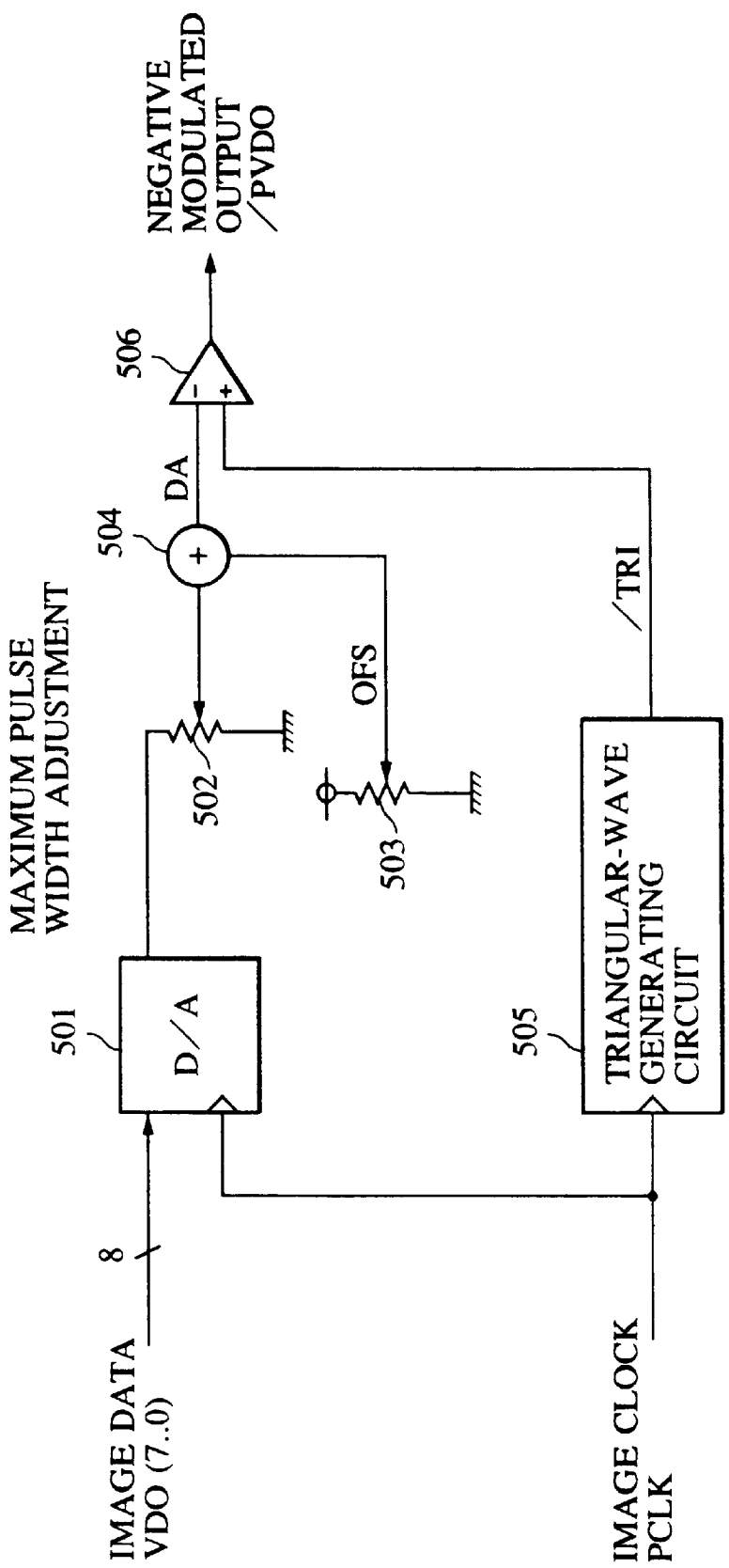
FIG. 1 shows the construction of a conventional pulse-width modulation circuit.
Figure 2:
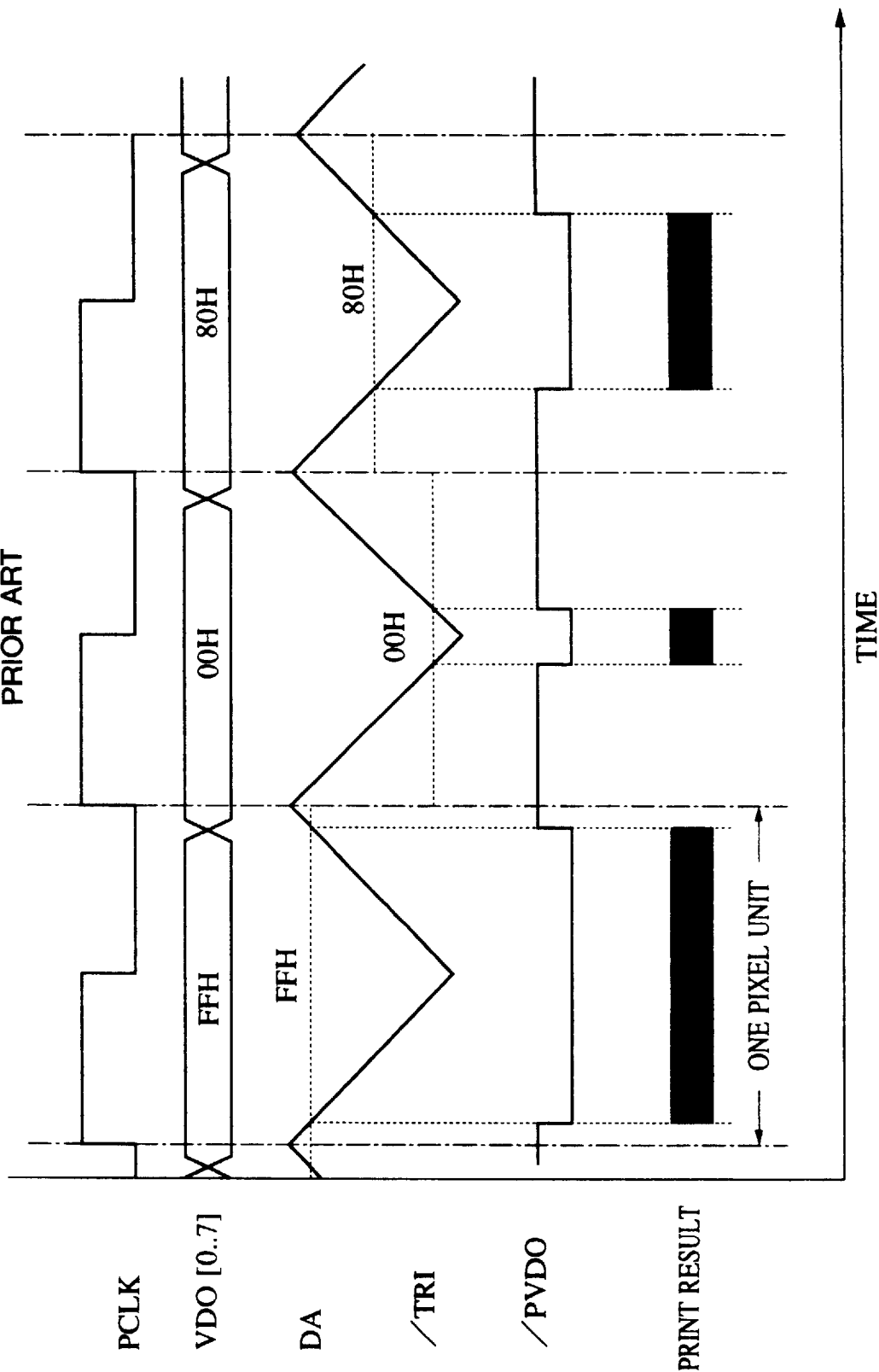
FIG. 2 shows signal waveforms of each section of the pulse-width modulation circuit shown in FIG. 1.
Figure 3:
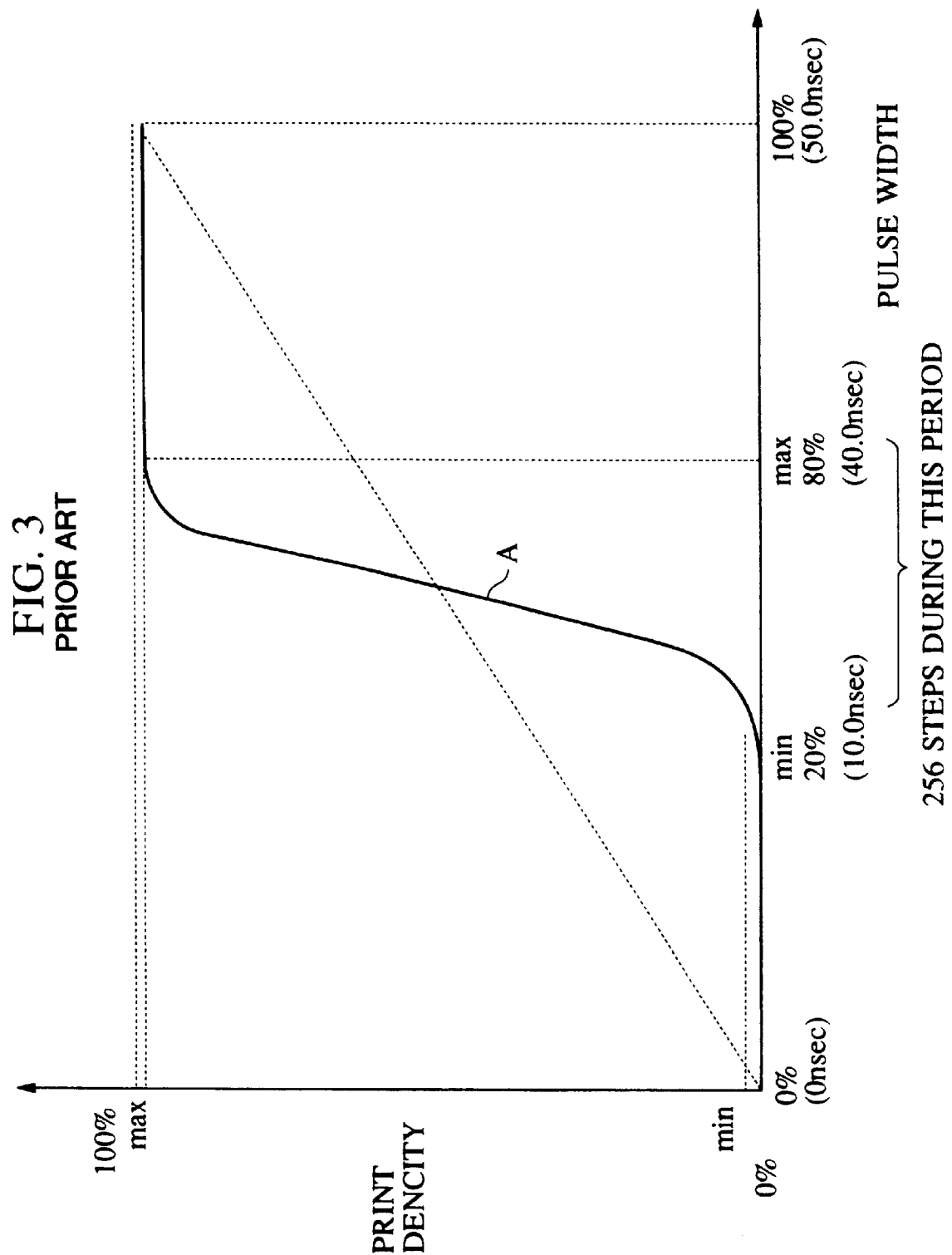
FIG. 3 shows the relation between the pulse width and the print density in an electrophotographic process.
Figure 4:
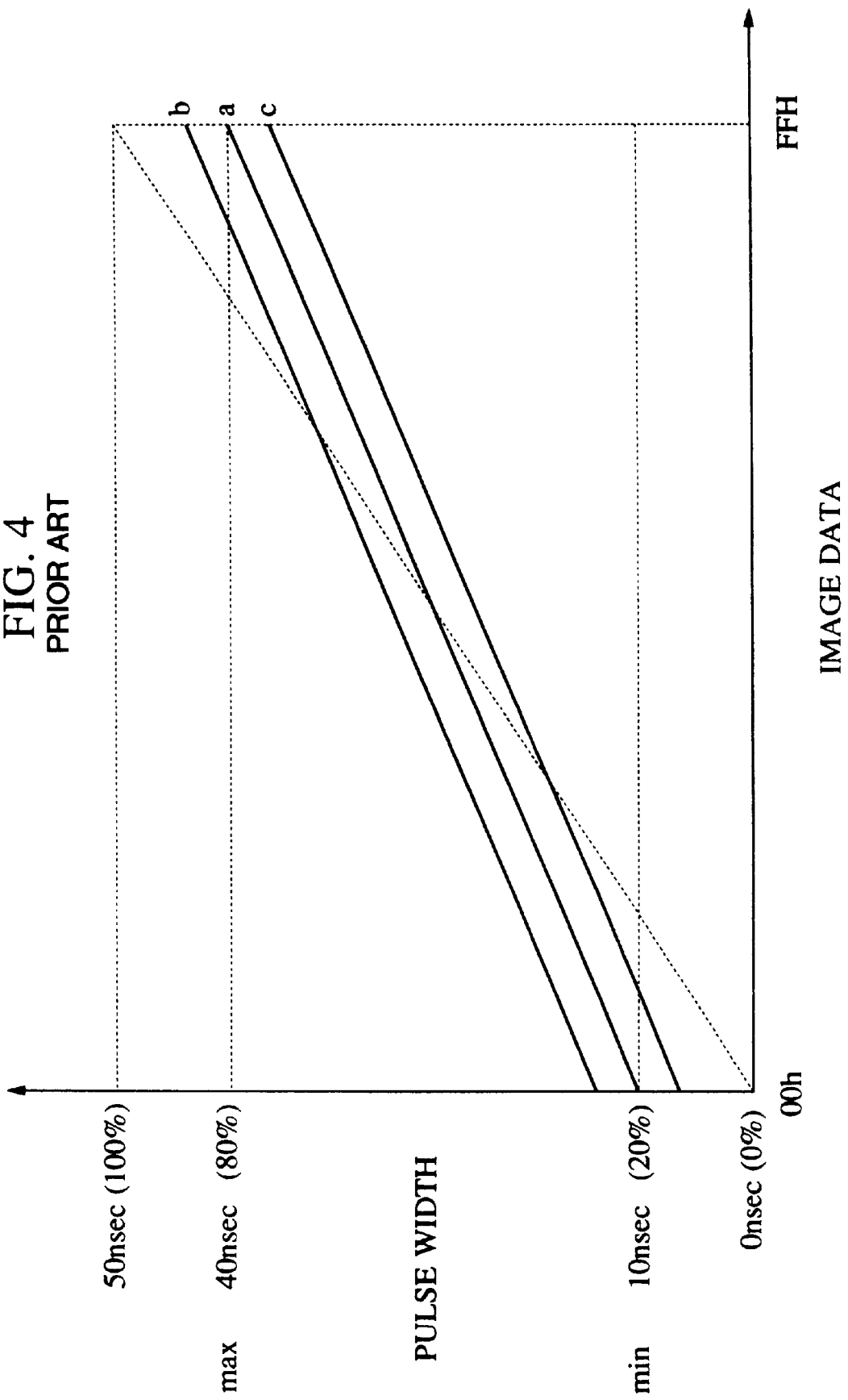
FIG. 4 shows variations of the pulse width set in the pulse-width modulation circuit shown in FIG. 1.

As described above, when the increase steps of the pulse width are made constant in the photographic process, the relation between the pulse width and the print density becomes a non-linear γ curve, as shown in FIG. 3. In this state, when minimum/maximum pulse width modulation is performed, the relation between the pulse width and the print density becomes a gradual A curve, shown in FIG. 9, which is still non-linear. The LUT 44 is used to correct the non-linear A curve to the linear C curve by making the change in the increase steps of the pulse width to a non-linear form as the B curve shown in FIG. 9. Since the γ curve differs depending on the number of PWM lines, the look-up table is prepared for each of the PWM lines.

The LUT 44 converts data by a data conversion table, an example of which is shown in FIG. 10. FIG. 10 shows an example of the initial values of the table data which is set by the control section 47 at power-on time. For example, 8-bit image data and the IMGCHR signal which are read out from the line memory 42 are input to the address terminal AD of SRAM which constitutes the LUT 44, and data corresponding to the address value thereof is output from the data terminal DT of the SRAM. The IMGCHR signal is output as it is. In this case, since terminal a of the switch device 43 is connected to terminal c thereof, data output from the LUT 44 is input to the PWM circuit 45. Also, the IMGCHR signal input to the LUT 44 is input to the control section 47, and the control section 47 switches the table data of the LUT 44 according to the IMGCHR signal.

Figure 11:
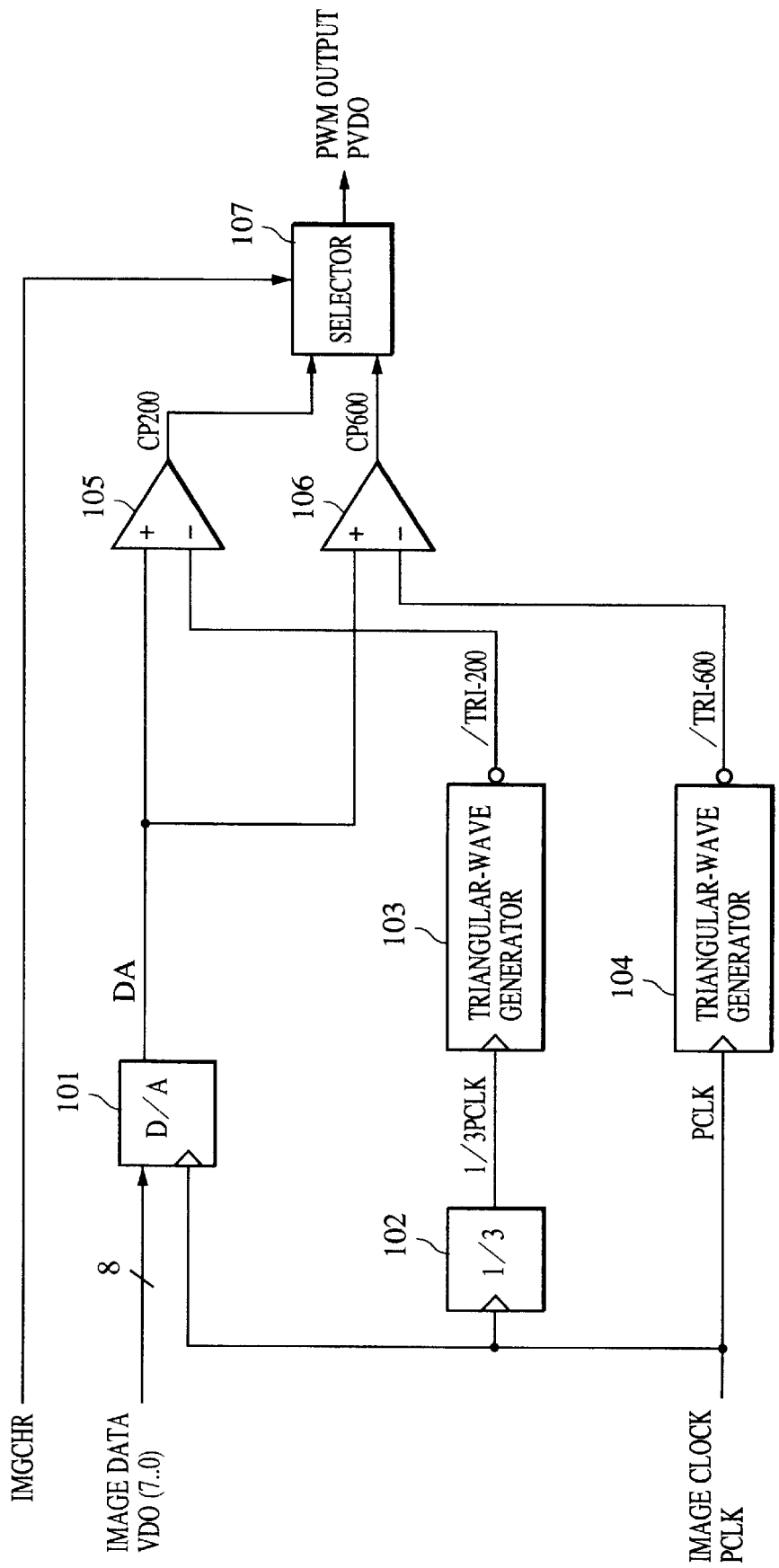
FIG. 11 is a block diagram illustrating the construction of the pulse-width modulation (PWM) circuit 45 shown in FIG. 8.

FIG. 11 is a block diagram illustrating an example of the construction of the PWM circuit 45. Reference numeral 101 denotes a D/A converter. Reference numeral 102 denotes a frequency divider for frequency-dividing the image clock PCLK by three. Reference numeral 103 denotes a triangular-wave generator for generating a triangular wave /TRI-200 in synchronization with the image clock 1/3 PCLK output from the frequency divider 102. Reference numeral 104 denotes a triangular-wave generating circuit for a triangular wave /TRI-600 in synchronization with the image clock PCLK. Reference numeral 105 denotes a comparator for comparing the output DA of the D/A converter 101 with the triangular wave /TRI-200 and outputting a PWM signal CP200 of 200 lines (200 dpi). Reference numeral 106 denotes a comparator for comparing the output DA of the D/A converter 101 with the triangular wave /TRI-600 and outputting a PWM signal CP600 of 600 lines (600 dpi). Reference numeral 107 denotes a selector for selecting the PWM signal CP200 or CP600 on the basis of the IMGCHR signal. The output of the selector 107 is sent out as the PWM output PVDO to the laser unit 705.

Figure 12:
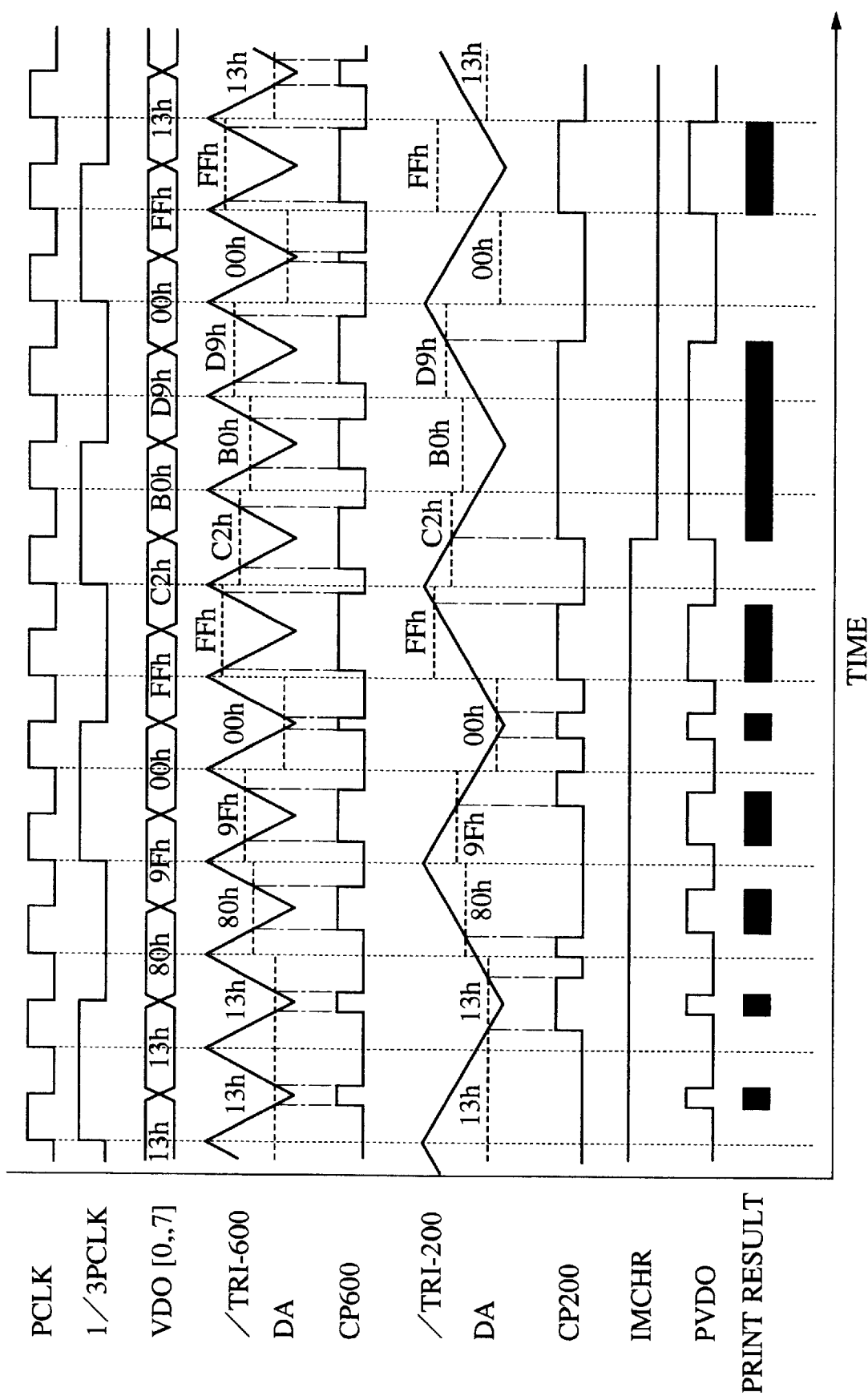
FIG. 12 shows signal waveforms of each section of the PWM circuit shown in FIG. 11.

FIG. 12 shows signal waveforms of each section of the PWM circuit 45, showing a state in which the comparator 105 performs a voltage comparison between the triangular wave /TRI-600 generated in synchronization with the image clock PCLK and the output DA of the D/A converter 101, proportional to the image data VDO (0 . . . 7), the comparator 106 performs a voltage comparison between the triangular wave /TRI-200 generated in synchronization with the image clock 1/3 PCLK and the output DA of the D/A converter 101, proportional to the image data VDO (0 . . . 7), and the pwm signals CP200 and CP600 output from the comparators 105 and 106 are selected by the selector 107 on the basis of the IMGCHR signal, and the PWM output PVDO is obtained.

In this way, the pulse-width modulation output PVDO output from the PWM circuit 45 is input to the laser driver 64 whereby the PVDO is converted into pulse current, causing the semiconductor laser 60 to blink.

[Correction of the Light Pulse Width]

Next, a description will be given of a method of measuring the light pulse width at an accuracy of 100 ps or more, and correcting the light pulse width. This correction calibrates the data conversion table of the LUT 44 by measuring the laser light which is pulse-width-modulated on the basis of the test data immediately after the power of the apparatus is turned on and each time printing starts.

Principle of Measuring the Light Pulse Width

Referring to FIG. 8, the control section 47 connects terminal b of the switch device 43 to terminal c thereof so as to send out image data TEST (0 . . . 7) for test purposes, and a number-of-lines switch signal TEST_IMG for test purposes, the details of which will be described later, to the PWM circuit 45. Since the PWM circuit 45 outputs the negative pulse-width modulation output PVDO responsive to TEST (0 . . . 7), the pulse waveform of laser light output from the semiconductor laser 60 also becomes responsive to TEST (0 . . . 7). The PIN photodiode 61 outputs electric current responsive to the pulse waveform of the laser light output from the semiconductor laser 60, and this electric current is converted into a voltage by a current-voltage converter 62. A voltage indicating the pulse waveform of laser light obtained in this way is converted into a TTL level by the TTL converter 63, and is input as a modulation signal PD to terminal D of the D-F/F 50.

Figure 13:
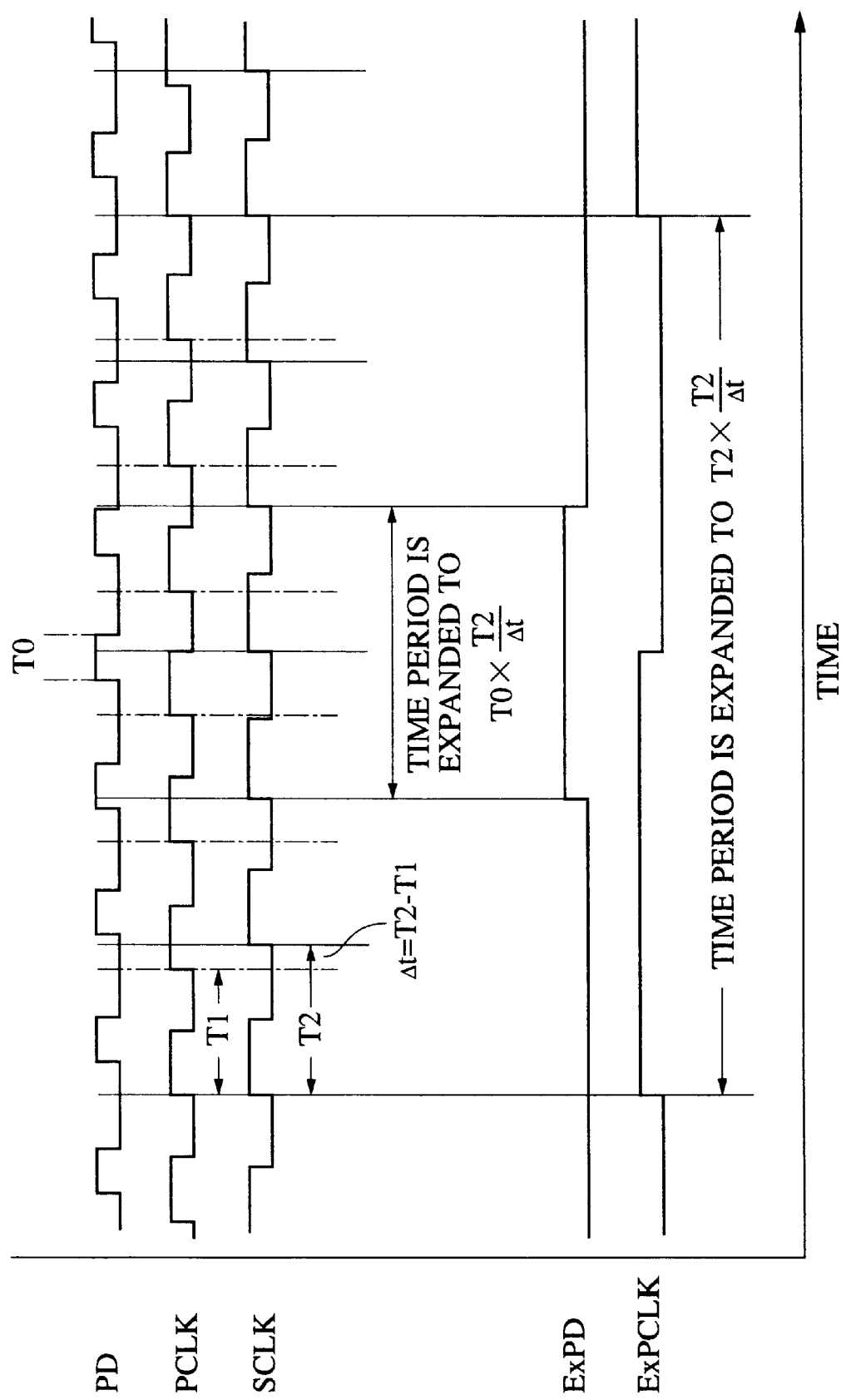
FIG. 13 is a timing diagram illustrating the state of sampling.

Since the pulse cycle of negative pulse-width modulation output PVDO output from the PWM circuit 45 is equal to the cycle of the image clock PCLK, the modulation signal PD input to the D-F/F 50 becomes a pulse signal of the PCLK (20 MHz). On the other hand, the sampling clock SCLK (19.99 MHz) is input to the clock input of the D-F/F 50. Therefore, as shown in FIG. 13, the D-F/F 50 performs an equivalent sampling of the modulation signal PD at frequency difference $\Delta t = T2 - T1 = 25$ ps between SCLK and PCLK. The output of the D-F/F 50 becomes ExPD in which PD is time-expanded to $T2/\Delta t$ times.

Similarly to that described above, the D-F/F 51 performs an equivalent sampling of the image clock PCLK at $\Delta t$, and outputs ExPCLK in which PCLK is time-expanded to $T2/\Delta t$ times.

In this embodiment, since the image clock PCLK is 20 MHz (50 ns), and the sampling clock SCLK is 19.99 MHz (50.025 ns), the difference $\Delta t$ between PCLK and SCLK becomes 25 ps. Therefore, an equivalent sampling of PCLK and PD whose cycle is 50 ns (T1) is performed, and its resolution (measurement accuracy) becomes 25 ps/50 ns=0.05%. In other words, an equivalent sampling of one cycle of PCLK is performed. With such measurement accuracy, it is possible to sufficiently measure PWM (whose resolution is 1/256=0.39%) of 8 bits (256).

To obtain the original time PD from the ExPD which is time-expanded to $T2/\Delta t$ times, ExPD may be multiplied by $\Delta t/T2$. However, a simple calculation causes a large error. FIGS. 14 and 15 show an occurrence of this error. As shown in FIG. 14, there are manufacturing variations of approximately, at the worst, ±100 ppm in the oscillation frequency of the clock generators 48 and 49. Therefore, since the variation of $\Delta t$ is calculated from a calculation of a minimum value=(SCLK(min)−PCLK (max)), and a maximum value=(SCLK(max)−PCLK (min)), errors of −28.6% and +66.7% at the worst occur, as shown in FIG. 15, making it impossible to obtain the required measurement accuracy.

Thus, by using the fact that a real time rate PD/PCLK is equal to the time-expanded rate ExPD/ExPCLK, both of ExPD and EXPCLK are measured, and the original time PD can be calculated on the basis of equation (1):

$$PD = PCLK \times ExPD/ExPCLK = 50 \text{ ns} \times EXPD/EXPCLK \qquad (1)$$

The errors contained in equation (1) are the frequency error ±100 ppm of PCLK, and the equivalent sampling error 700 ppm (=1/1429, see FIG. 15) of ExPD and ExPCLK. The error of PD is considerably smaller than the error of PD in a case in which a multiplication is made by $\Delta t/T2$. Further, when the difference $\Delta t$ between SCLK and PCJK is small, the equivalent sampling error becomes small, and the errors contained in equation (1) become small. For example, the equivalent sampling error at the maximum sampling time shown in FIG. 15 becomes 300 ppm (=1/3333).

Figure 16:
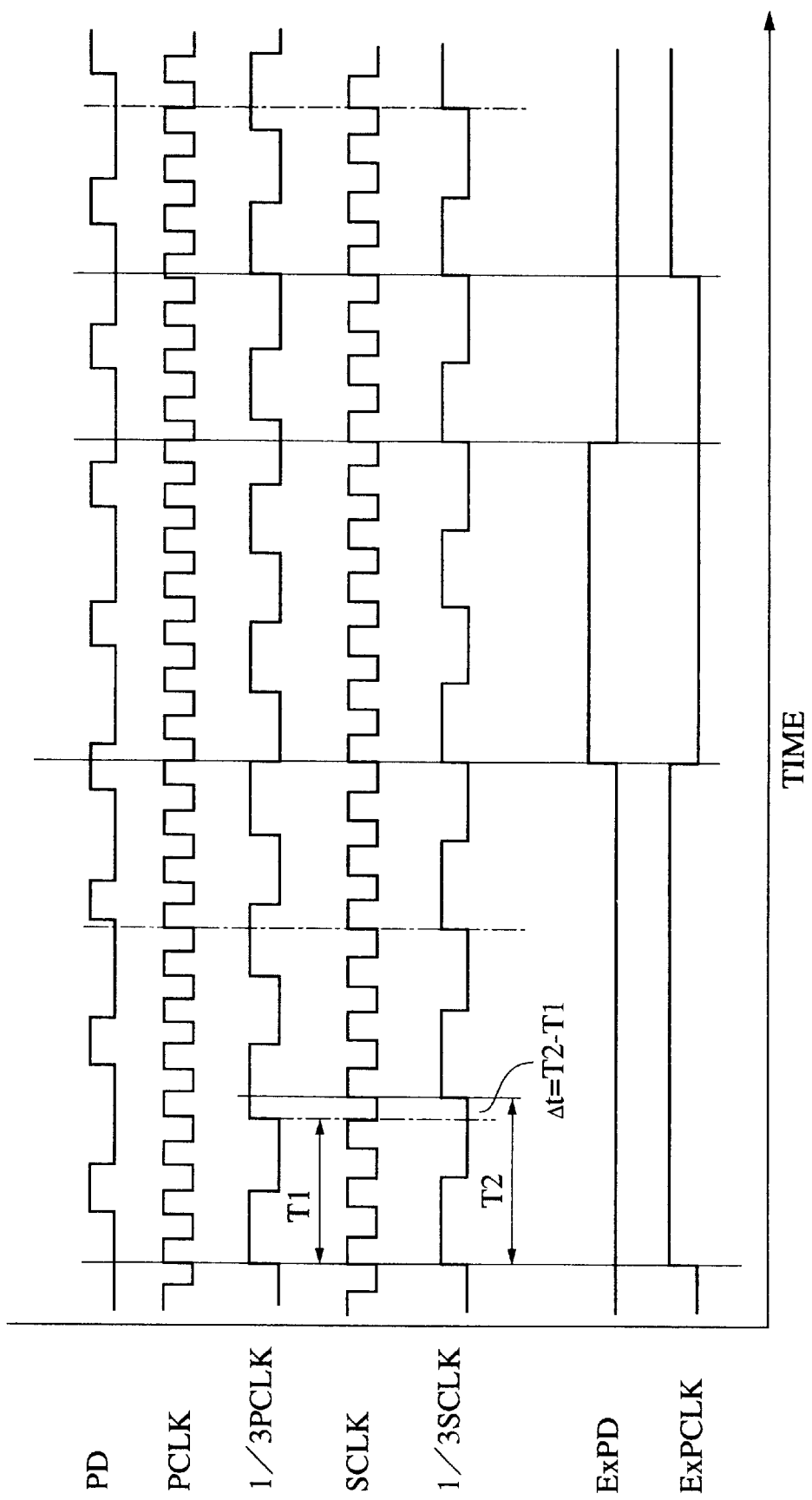
FIG. 16 is a timing diagram which shows the state of sampling by a clock in which a sampling clock (SCLK) is frequency-divided into three.

The above description is concerned with a case of 600-line PWM, and nearly the same applies as well to a case of 200-line PWM. Since two out of three data sampled by SCLK are mixed with unnecessary sampling data, the unnecessary sampling data must be thinned out, or sampled at a clock in which SCLK is frequency-divided by three, as shown in FIG. 16. In this embodiment, the data is sampled by SCLK in the case of 200 lines as well, and two out of three unnecessary sampling data are thinned out.

Edge Storing Circuit

Next, a description will be given of a method of measuring time-expanded ExPD and ExPCLK.

Figure 17:
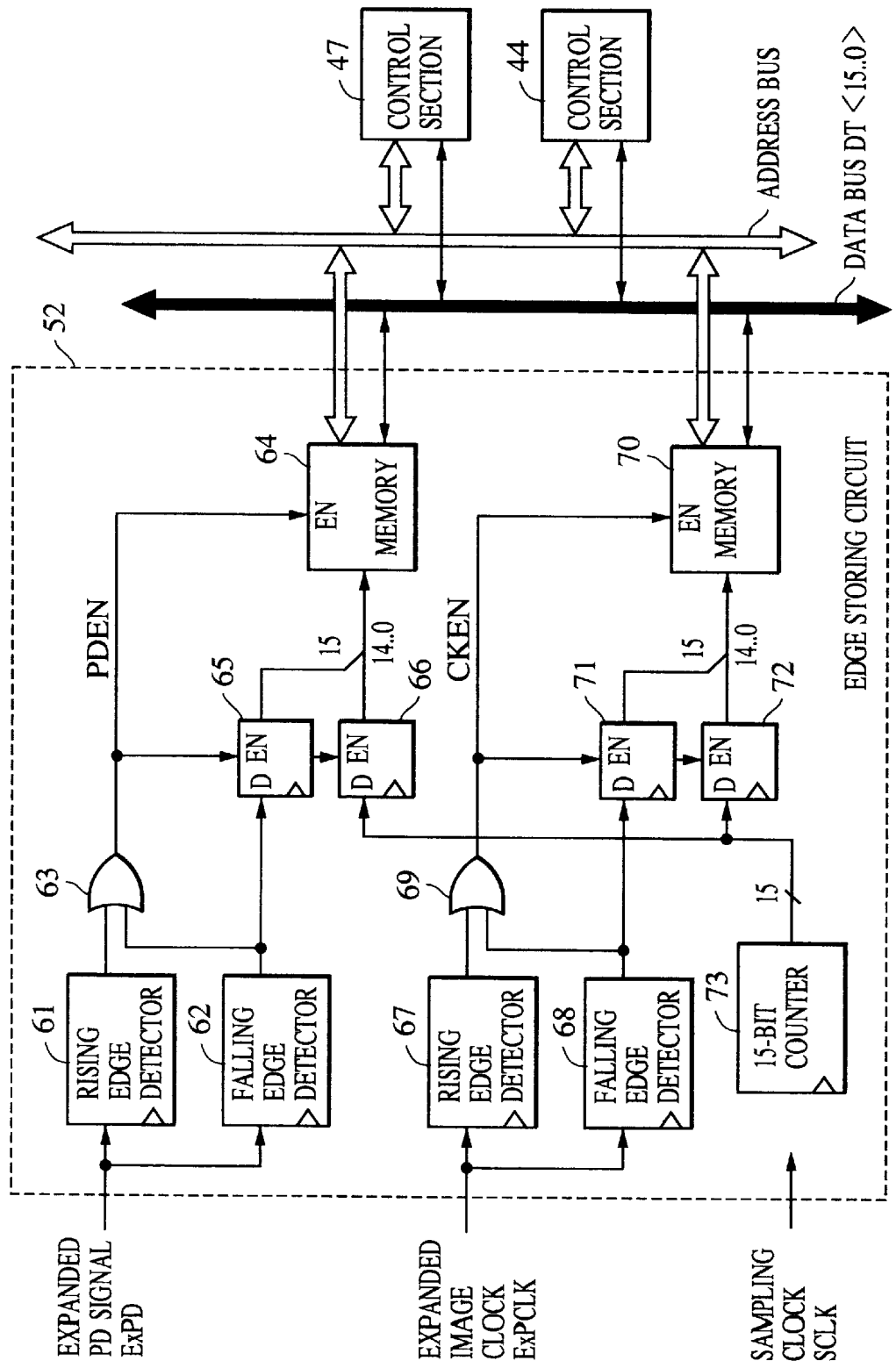
FIG. 17 is a block diagram illustrating the detailed construction of the edge storing circuit 52 shown in FIG. 8.
Figure 18:
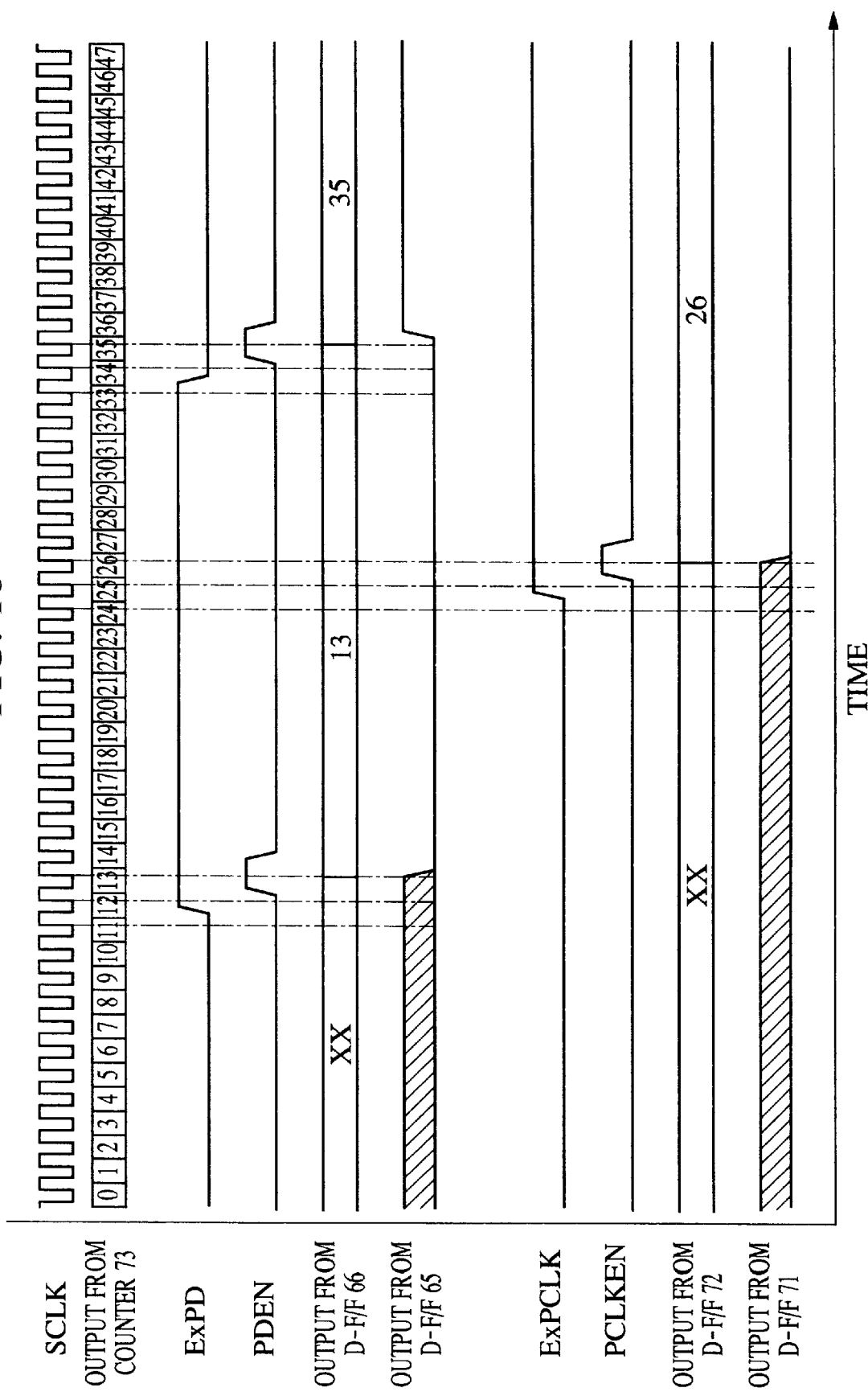
FIG. 18 is a timing diagram illustrating the operation of the edge storing circuit shown in FIG. 17.

The edge storing circuit 52 shown in FIG. 8 stores time information of the rising/falling edges of ExPD and ExPCLK by hardware means. FIG. 17 is a block diagram illustrating the detailed construction of the edge storing circuit 52. FIG. 18 is a timing chart illustrating the operation of the edge storing circuit 52.

Referring to FIG. 17, reference numerals 61 and 67 each denote rising edge detectors for detecting the rising edge. Reference numerals 62 and 68 each denote falling edge detectors for detecting the falling edge. Reference numerals 63 and 69 each denote OR gates. Reference numerals 64 and 70 each denote memories. Reference numerals 65, 66, 71, and 72 each denote D-F/F with enable hold. Reference numeral 73 denotes a 15-bit counter 73.

Figure 19:
FIG. 19 shows the format of data stored in a memory shown in FIG. 17.

The edge storing circuit 52 operates with SCLK as a system clock. The counter 73 starts counting SCLK at the same time as this measurement. Upon detecting the rising edge of ExPD, the rising edge detector 61 causes a signal PDEN which is supplied to the D-F/Fs 65 and 66 and the memory 64 after passing through the OR gate 63 to reach a "H" level for a period of one clock in order to indicate the detection of the edge of ExPD. The signal PDEN causes the D-F/Fs 65 and 66 to be enabled to hold the count value ("13" in FIG. 18) of the counter 73 at this time and the output value ("0") of the falling edge detector 62. The values held in the D-F/Fs 65 and 66 are stored in the memory 64 in the form shown in FIG. 19.

Next, upon detecting the falling edge of ExPD, the falling edge detector 62 causes the signal PDEN to reach a "H" level for a period of one clock. Similarly to that described above, the D-F/Fs 61 and 62 are enabled to hold the count value ("35" in FIG. 18) of the counter 73 at this time and the output value ("1") of the falling edge detector 62. The values held in the D-F/Fs 65 and 66 are stored in the memory 64 in the form shown in FIG. 19.

As described above, since a flag R/F for indicating the rising/falling edge, and a count value when an edge occurs in ExPD, are stored in sequence in the memory 64, as a result, data shown in FIG. 20 is stored in the memory 64. For ExCLK, similarly to ExPD, since a flag R/F for indicating the rising/falling edge, and a count value when an edge occurs in ExPD, are stored in sequence in the memory 70, as a result, data shown in FIG. 21 is stored in the memory 70.

When the edge information of ExPD and ExPCLK are completely stored in the memory 64 and the memory 70 as described above, the control section 47 calculates the number of counts from the falling edges of ExPD and EXPCLK to the falling edges thereof. For example, in FIG. 20, the count number corresponding to the pulse width on the positive side of ExPD becomes 35−13=22, and in FIG. 21, the count number corresponding to one cycle of ExPCLK becomes 2026−26=2000.

The control section 47 is able to obtain the pulse width (50×22/2000=0.55 ns) of PD on the basis of these count numbers and equation (1), and the pulse width of the laser light which is actually emitted by the semiconductor laser 60 in the case of 600-line (600 dpi) PWM.

In the case of 200-line (200 dpi) PWM, sampling data, two out of three of which are not required, is stored in the memories 64 and 70, an example of which is shown in FIGS. 22 and 23. Therefore, the control section 47 thins out these unnecessary sampling data in order to calculate the pulse width of PD on the basis of the required sampling data.

Correction of the Light Pulse Width

Figure 24:
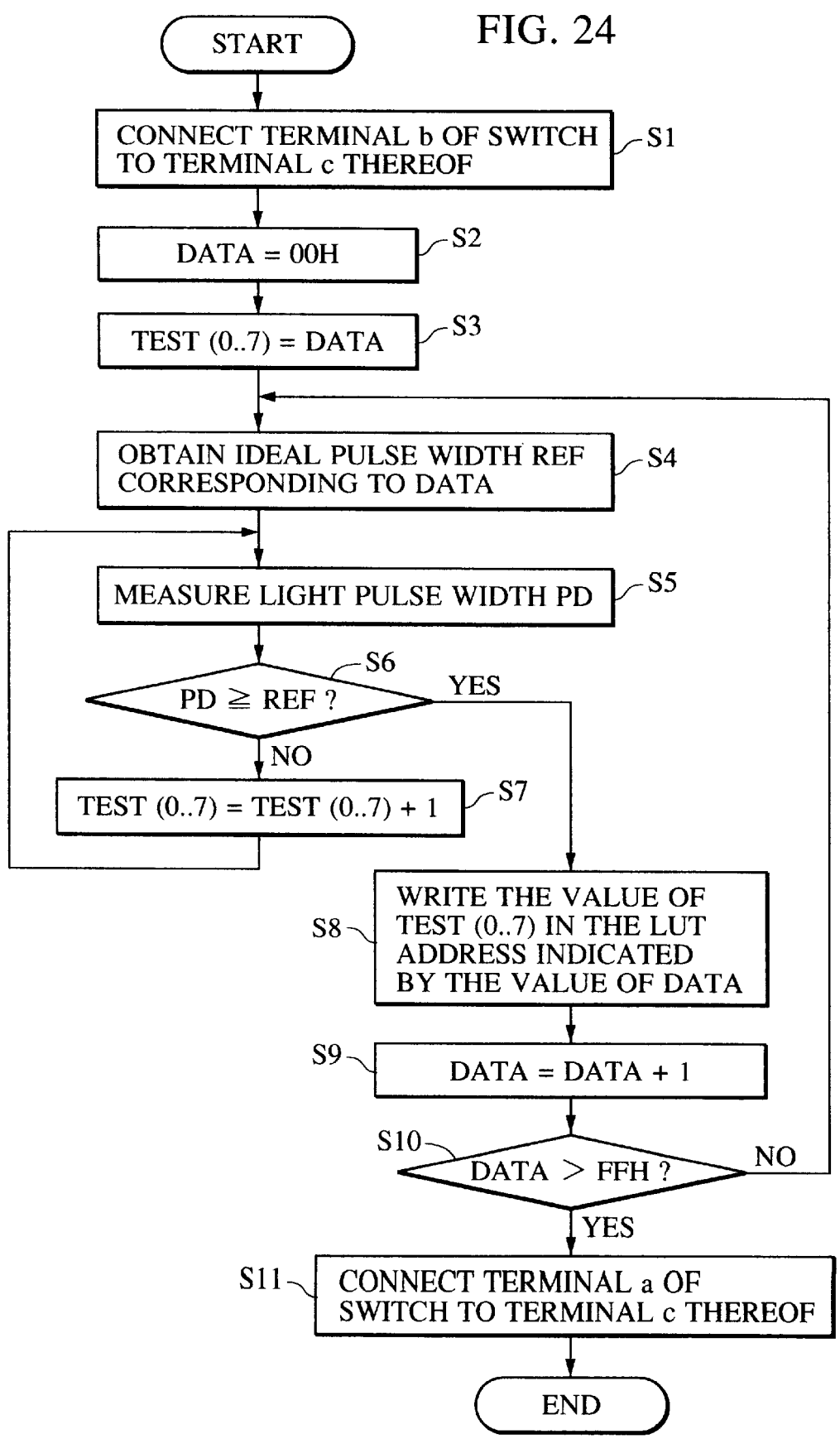
FIG. 24 is a flowchart illustrating a process of correcting the light pulse width.

Next, a description will be given of a method of correcting the light pulse width by rewriting the LUT 44 on the basis of the measured result of the light pulse width. FIG. 24 is a flowchart illustrating an example of procedural steps for correcting the light pulse width, which steps are executed by the control section 47.

Initially, in step SI, terminal b of a switch device 43 is connected to terminal c so as to directly turn on the semiconductor laser 60 on the basis of image data TEST (0 . . . 7) for test purposes. Next, in step S2, to correct the pulse width when the image data is 00h, 00h is set at variable DATA, and in step S3, the value of the variable DATA is set at TEST (0 . . . 7). Then, in step S4, an ideal pulse width REF to be set when image data is 00h is obtained. The ideal pulse width REF is stored as a table map in a ROM contained in the control section 47.

Then, in step S5, the light pulse width PD of the semiconductor laser 60 is measured by the above-described method, and PD is compared with REF in step S6. If PD<REF, TEST (0 . . . 7) is incremented in step S7, and the process returns to step S5 where the light pulse width PD is measured again. If PD>REF, since the value of TEST (0 . . . 7) at this time is image data which realizes the ideal pulse width REF, TEST (0 . . . 7) is written at the address of the LUT 44 indicated by the value of the variable DATA in step S8. For example, in a case in which the variable DATA is 00h, and PD>REF is obtained when TEST (0 . . . 7) is 04h, 04h is written at address 00h of the LUT 44, an example of which is shown in FIG. 25.

Next, the value of the variable DATA is incremented in step S9. Step S4 to step S10 are repeatedly performed until the value of the variable DATA exceeds FFH according to the determination in step 10. In this way, when the writing of the table of the LUT 44 is terminated, terminal a of the switch device 43 is connected to terminal c in step S11, and the process returns to the normal print operation.

Although an example in which all pulse widths of 8 bits are corrected is shown in the procedural steps shown in FIG. 24, the following method may be employed in which an amount of the increase of the variable DATA in step S9 is changed to obtain correction data by measurement for only the typical pulse width, and correction data is obtained by interpolation for the section between measurement points.

As has been described up to this point, according to this embodiment, the pulse width of laser light can be measured with a high degree of accuracy by sampling the pulse waveform of the laser light and the image clock by using a sampling clock of a frequency very close to the frequency of the image clock. Thus, by measuring the relation between the image data and the pulse width of the laser light, and by calibrating the table of a look-up table for linearly correcting the change in the increase step of the light pulse width, variations in the pulse width adjustment before the product is shipped, an influence of temperature and humidity changes, and aging can be eliminated, and thus high-quality print output whose gradation is always stable can be obtained.

Further, in a case in which the pulse width of laser light which is pulse-width-modulated in units of a plurality of dots is measured, unnecessary data can be thinned out from the data which is continuously sampled in order to compute the pulse width on the basis of the required sampling data.

In this way, by linearly correcting the change in the increase step of the light pulse width, a high quality full-color image which is always stable can be obtained, in particular, in a full-color printer in which gradation printing is performed for each toner color of magenta, cyan, yellow, and black, and a full-color image is formed by superimposing the colors.

[Second Embodiment]

An image processing apparatus of a second embodiment of the present invention will be described below. Components in the second embodiment which are substantially the same as those of the first embodiment are given the same reference numerals, and a detailed description thereof is omitted.

In the above-described first embodiment, the light waveform of the semiconductor laser 60, which is pulse-width-modulated, is measured, and a pulse width correction, including even variations caused by the semiconductor laser 60, is performed. However, in a case in which variations in the threshold value, such as the light emission current value of the semiconductor laser 60, can be ignored by an apparatus for suppressing the temperature dependence of the semiconductor laser 60 or a circuit contrivance, the pulse width of the electrical signals for driving the semiconductor laser 60 may be measured to rewrite the conversion table of the LUT 44. The second embodiment measures the pulse signal output of the PWM circuit 45 in each of the 600-line (600 dpi) PWM and the 200-line (200 dpi) PWM, and calibrates the conversion table.

Figure 26:
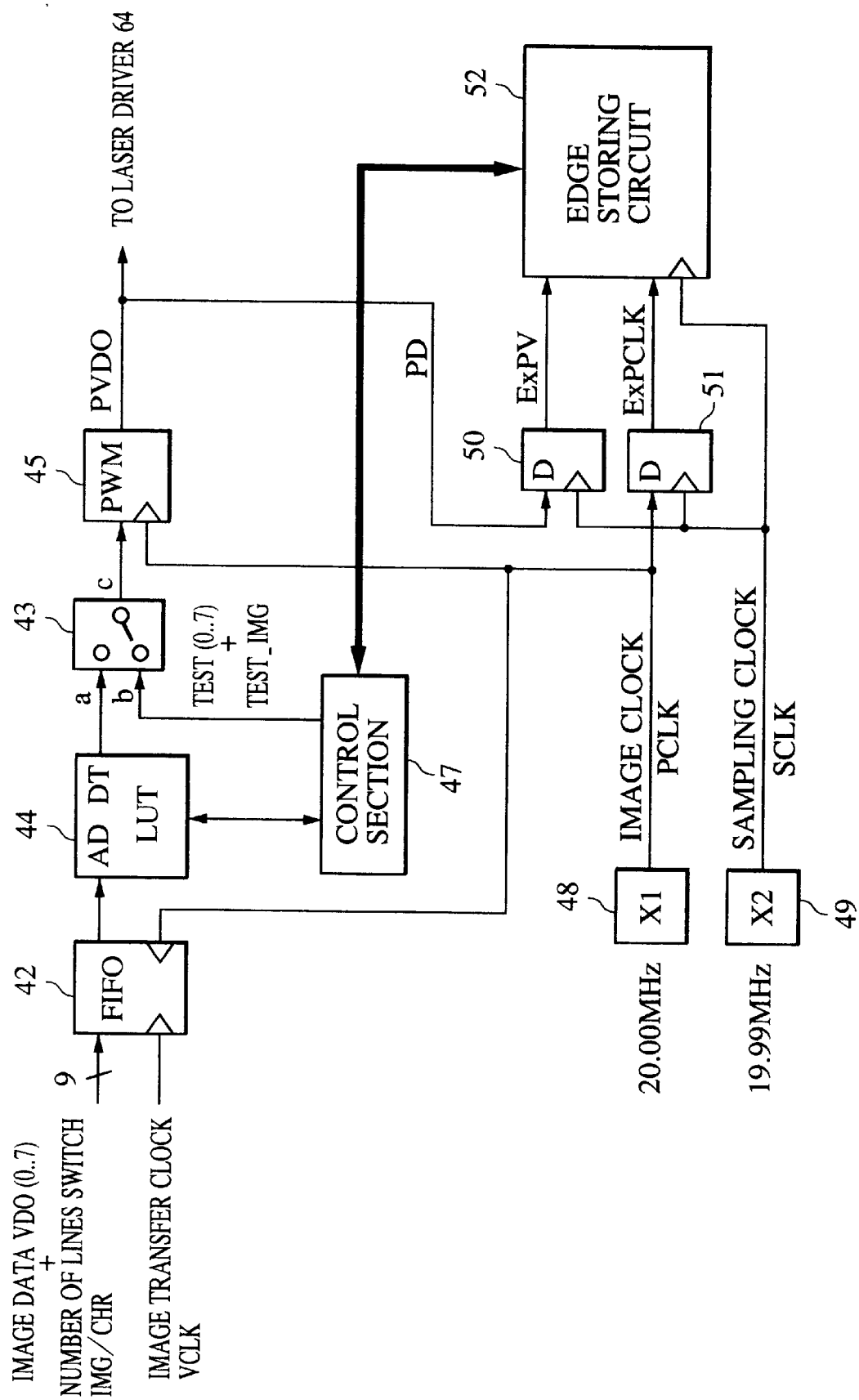
FIG. 26 is a block diagram illustrating the detailed construction of an image processing section in accordance with a second embodiment of the present invention.

FIG. 26 is a block diagram illustrating the detailed construction of the image processing section 704 in accordance with the second embodiment. The second embodiment is the same as the first embodiment except that the input of the D-F/F 50 is not the light pulse width signal PD, but the pulse width modulation output PVDO of the PWM circuit 45.

[Third Embodiment]

An image processing apparatus of a third embodiment of the present invention will be described below. Components in the third embodiment which are substantially the same as those of the first embodiment are given the same reference numerals, and a detailed description thereof is omitted.

The above-described first embodiment describes an example in which sampling is performed at the same clock SCLK in the case of both 600-line (600 dpi) and 200-line (200 dpi) PWM. However, as described above, if sampling is performed by frequency-dividing the sampling clock according to the number of PWM lines, it is possible to make unnecessary sampling data not occur.

Figure 27:
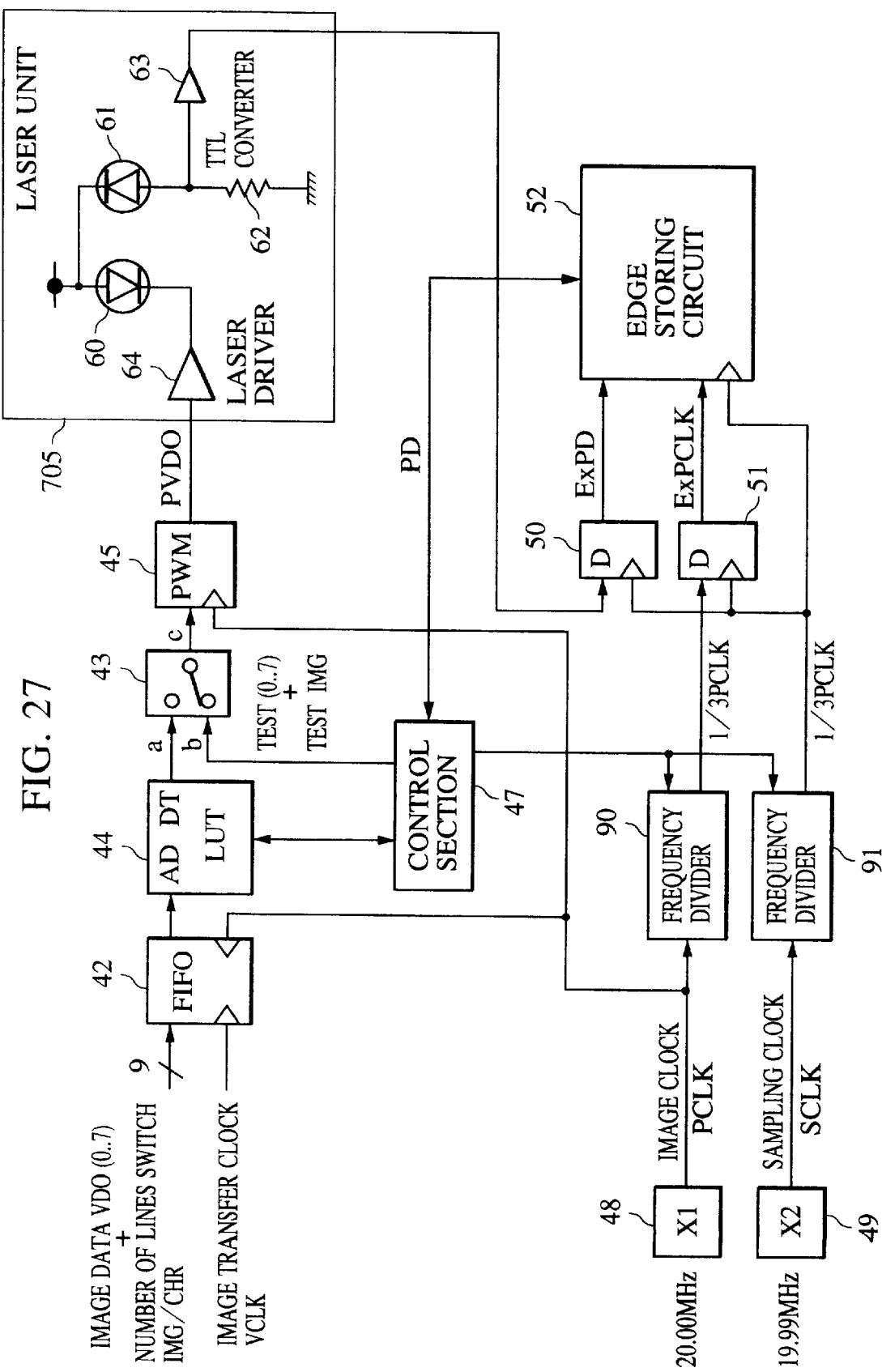
FIG. 27 is a block diagram illustrating the detailed construction of an image processing section and a laser unit in accordance with a third embodiment of the present invention.

FIG. 27 is a block diagram illustrating the detailed construction of the image processing section 704 and the laser unit 705 in accordance with the third embodiment. Reference numerals 90 and 91 each denote frequency dividers which are controlled by the control section 47. When the pulse width of PD is measured in 600-line PWM, the image clock PCLK and the sampling clock SCLK are supplied to the D-F/F 50 and 51 and the edge storing circuit 52 without frequency-dividing the image clock PCLK and the sampling clock SCLK. When the pulse width of PD is measured in 200-line PWM, the image clock PCLK and the sampling clock SCLK are supplied to the D-F/F 50 and 51 and the edge storing circuit 52 by frequency-dividing the image clock PCLK and the sampling clock SCLK into three, respectively.

As described above, when the pulse width of the laser light which is modulated by 200-line PWM is measured, it is possible for the control section 47 to compute the pulse width of PD without thinning out the sampling data since unnecessary sampling data does not occur as a result of the frequency dividing of the sampling clock by three.

The present invention may be employed in other various forms without departing from the spirit and scope of the present invention.

For example, the present invention may be applied to a system comprising a plurality of apparatuses, or to an apparatus constituted of one unit.

Needless to say, the present invention may be applied to a case in which the present invention is achieved by supplying a program which is recorded on a recording medium to a system or apparatus. Recording media for supplying a program include floppy disks, hard disks, optical disks, CD-ROMs, magnetic tape, non-volatile memory cards, and ROM.

In other words, the foregoing description of embodiments has been given for illustrative purposes only and not to be construed as imposing any limitation in any respect.

The scope of the invention is, therefore, to be determined solely by the following claims and is not limited by the text of the specification, and alterations made within a scope equivalent to the scope of the claims falls within the true spirit and scope of the invention.

What is claimed is:

1. An image processing apparatus comprising:

input means for inputting an image signal;

correcting means for correcting the image signal;

generating means for generating a pulse-width modulation signal responsive to the image signal corrected by said correcting means;

light emitting means for emitting light on the basis of the pulse-width modulation signal;

detecting means for detecting a pulse width of light emitted by said light emitting means; and setting means for setting a correction characteristic of said correcting means on the basis of the pulse width detected by said detecting means, wherein said detecting means detects the pulse width of light generated by a predetermined signal.

2. An image processing apparatus according to claim 1, wherein said detecting means comprises:

conversion means for converting light emitted from said light emitting means to an electrical signal;

generating means for generating a first clock indicating a number of pixels and a second clock having a frequency different from that of the first clock;

sampling means for sampling the electrical signal output from said conversion means and the first clock respectively on the basis of the second clock; and computing means for computing the pulse width on the basis of the sampling result of said sampling means.

3. An image processing apparatus according to claim 2, wherein the frequency of the first clock is very close to the frequency of the second clock.

4. An image processing apparatus according to claim 2, wherein said generating means generates a pulse-width modulation signal by comparing the image signal corrected by said correcting means with a pattern signal of a predetermined frequency.

5. An image processing apparatus according to claim 4, wherein said input means inputs a switch signal for switching a cycle of the pattern signal.

6. An image processing apparatus according to claim 5, wherein said correcting means changes the correction characteristic according to the switch signal.

7. A printer including the apparatus according to claim 1.

8. An image processing apparatus comprising:

input means for inputting an image signal;

correcting means for correcting the image signal;

generating means for generating a pulse-width modulation signal responsive to the image signal corrected by said correcting means;

detecting means for detecting a pulse width of the pulse-width modulation signal generated by said generating means; and setting means for setting a correction characteristic of said correcting means on the basis of the pulse width detected by said detecting means, wherein said detecting means detects the pulse width of the pulse-width modulation signal generated by a predetermined signal.

9. An image processing apparatus according to claim 8, wherein said detecting means comprises:

generating means for generating a first clock indicating pixels and a second clock having a frequency different from that of the first clock;

sampling means for sampling electrical signals output from said conversion means and the first clock respectively on the basis of the second clock; and computing means for computing the pulse width on the basis of the sampling result of said sampling means.

10. An image processing apparatus according to claim 9, wherein a frequency of said first clock is very close to the frequency of said second clock.

11. An image processing apparatus according to claim 9, wherein said generating means generates a pulse-width modulation signal by comparing the image signal corrected by said correcting means with a pattern signal of a predetermined frequency.

12. An image processing apparatus according to claim 11, wherein said input means inputs a switch signal for switching a cycle of the pattern signal.

13. An image processing apparatus according to claim 12, wherein said correction means comprises quantization means for quantizing the image signal in which correction conditions are converted according to the switch signal.

14. A printer including the apparatus according to claim 8.

15. An image processing method, comprising:

an input step of inputting an image signal a correcting step of correcting the image signal;

a generating step of generating a pulse-width modulation signal responsive to the image signal corrected in said correcting step;

a light emitting step of emitting light on a basis of the pulse-width modulation signal;

a detecting step of detecting a pulse width of light emitted in said light emitting step; and a setting step of setting a correction characteristic of said correcting step on a basis of the pulse width detected in said detecting step, wherein said detecting step detects the pulse width of light generated by a predetermined signal.

16. An image processing method comprising:

an input step of inputting an image signal;

a correcting step of correcting the image signal;

a generating step of generating a pulse-width modulation signal responsive to the image signal corrected in said correcting step;

a detecting step of detecting a pulse width of the pulse-width modulation signal generated in said generating step; and a setting step of setting a correction characteristic of said correcting step on a basis of the pulse width detected in said detecting step, wherein said detecting step detects the pulse width of the pulse-width modulation signal generated by a predetermined signal.

17. An image processing apparatus, comprising:

input means for inputting an image signal;

generating means for generating a pulse-width modulation signal by comparing the image signal with a pattern signal of a predetermined frequency;

light emitting means for emitting light on the basis of the pulse-width modulation signal;

detecting means for detecting a pulse width of light emitted by said light emitting means; and correcting means for correcting levels of the pattern signal and the image signal relative to each other, on a basis of the pulse width detected by said detecting means, wherein said detecting means detects the pulse width of light generated by a predetermined test signal and said correcting means corrects levels of the pattern signal and the image signal relative to each other, at least at a time when power is applied to the apparatus.

18. An image processing apparatus according to claim 17, wherein said detecting means comprises:

conversion means for converting light emitted from said light emitting means to an electrical signal;

generating means for generating a first clock indicating a number of pixels and a second clock having a frequency different from that of the first clock;

sampling means for sampling electrical signals output from said conversion means and the first clock, respectively, on the basis of the second clock; and computing means for computing the pulse width on the basis of a sampling result of said sampling means.

19. An image processing apparatus according to claim 18, wherein the frequency of the first clock is very close to the frequency of the second clock.

20. A printer including the apparatus according to claim 17.

21. An image processing apparatus, comprising:

input means for inputting an image signal;

generating means for generating a pulse-width modulation signal by comparing the image signal with a pattern signal of a predetermined frequency;

detecting means for detecting a pulse width of a pulse-width modulation signal generated by said generating means; and correcting means for correcting levels of the pattern signal and the image signal relative to each other, on a basis of the pulse width detected by said detecting means, wherein said detecting means detects the pulse width of the pulse-width modulation signal generated by a predetermined signal and said correcting means corrects levels of the pattern signal and the image signal relative to each other, at least at a time when power is applied to the apparatus.

22. An image processing apparatus according to claim 21, wherein said detecting means comprises:

conversion means for converting light emitted from said light emitting means to electrical signals;

generating means for generating a first clock indicating a number of pixels and a second clock having a frequency different from that of the first clock;

sampling means for sampling electrical signals output from said conversion means and the first clock respectively on the basis of the second clock; and computing means for computing the pulse width on the basis of the sampling result of said sampling means.

23. An image processing apparatus according to claim 22, wherein the frequency of the first clock is very close to the frequency of the second clock.

24. A printer including the apparatus according to claim 21.

25. An image processing method of operating an image processing apparatus comprising:

an input step of inputting an image signal;

a generating step of generating a pulse-width modulation signal by comparing the image signal with a pattern signal of a predetermined frequency;

a light emitting step of emitting light on a basis of the pulse-width modulation signal;

a detecting step of detecting a pulse width of light emitted in said light emitting step; and a correcting step of correcting levels of the pattern signal and the image signal relative to each other, on a basis of the pulse width detected in said detecting step, wherein said detecting step detects the pulse width of light generated by a predetermined test signal and said correcting step corrects levels of the pattern signal and the image signal relative to each other, at least at a time when power is applied to the apparatus.

26. An image processing method of operating an image processing apparatus, comprising:

an input step of inputting an image signal;

a generating step of generating a pulse-width modulation signal by comparing the image signal with a pattern signal of a predetermined frequency;

a detecting step of detecting a pulse width of a pulse-width modulation signal generated in said generating step; and a correcting step of correcting levels of the pattern signal and the image signal relative to each other, on the basis of the pulse width detected in said detecting step, wherein said detecting step detects the pulse width of the pulse-width modulation signal generated by a predetermined signal and said correcting step corrects levels of the pattern signal and the image signal relative to each other, at least at a time when power is applied to the apparatus.

* * * * *

UNITED STATES PATENT AND TRADEMARK OFFICE
CERTIFICATE OF CORRECTION

Figure 9:
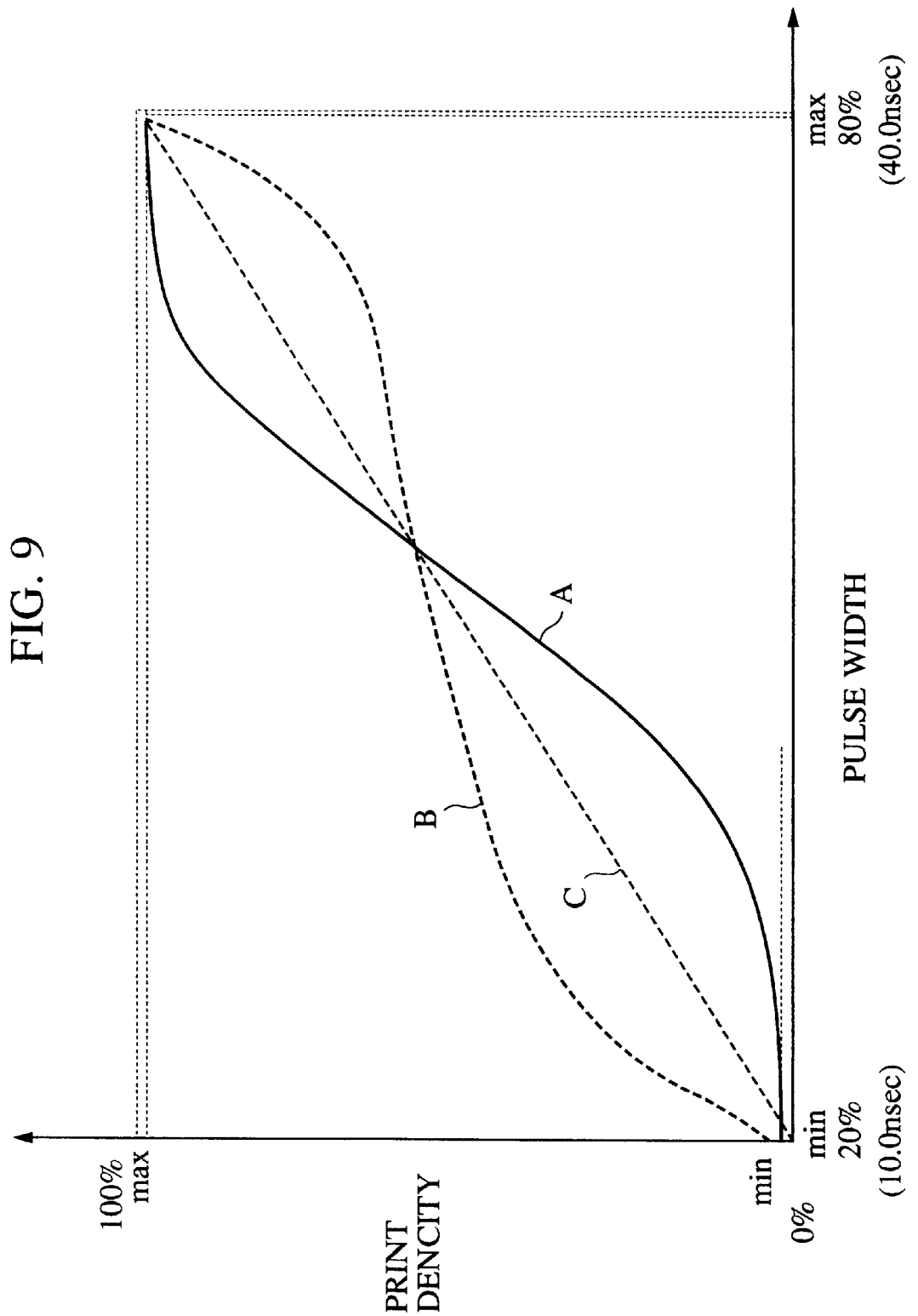
FIG. 9 shows a method of correcting a gamma curve.

PATENT NO.   :   6,037,966
DATED        :   March 14, 2000
INVENTOR(S)  :   MANABU SAKAKIBARA It is certified that error appears in the above-identified patent and that said Letters Patent is hereby corrected as shown below:

SHEET 9:

FIGURE 9, "DENCITY" should read --DENSITY--.

COLUMN 2:

Line 15, "195 Ps" should read --195 ps--.

COLUMN 8:

Line 7, "At" should read --$\Delta$t--; and
    Line 33, "EXPD/EXPCLK" should read --ExPD/ExPCLK--.

COLUMN 9:

Line 8, "a" should read --an--;
    Line 17, "a" should read --an--; and
    Line 36, "EXPCLK" should read --ExPCLK--.

COLUMN 10:

Line 8, "PD>REF," should read --PD$\geq$REF,--; and
    Line 13, "PD>REF" should read --PD$\geq$REF--.

UNITED STATES PATENT AND TRADEMARK OFFICE
CERTIFICATE OF CORRECTION

PATENT NO. : 6,037,966
DATED : March 14, 2000
INVENTOR(S) : MANABU SAKAKIBARA

It is certified that error appears in the above-identified patent and that said Letters Patent is hereby corrected as shown below:

COLUMN 13:

Line 23, "signal" should read --signal;--.

Signed and Sealed this

Twenty-fourth Day of April, 2001

*Attest:*

NICHOLAS P. GODICI

*Attesting Officer*    *Acting Director of the United States Patent and Trademark Office*